United States Patent
Donohoe et al.

(10) Patent No.: US 9,196,017 B2
(45) Date of Patent: Nov. 24, 2015

(54) APPARATUS, SYSTEMS, AND METHODS FOR REMOVING NOISE FROM AN IMAGE

(71) Applicant: Linear Algebra Technologies Limited, Dublin (IE)

(72) Inventors: David Donohoe, Ontario (CA); Brendan Barry, Dublin (IE); David Moloney, Dublin (IE); Richard Richmond, Belfast (GB); Fergal Connor, Dundalk (IE)

(73) Assignee: Linear Algebra Technologies Limited, Dublin (IE)

( * ) Notice: Subject to any disclaimer, the term of this patent is extended or adjusted under 35 U.S.C. 154(b) by 171 days.

(21) Appl. No.: 14/081,462

(22) Filed: Nov. 15, 2013

(65) Prior Publication Data

US 2015/0138405 A1    May 21, 2015

(51) Int. Cl.
*G06K 9/00* (2006.01)
*G06T 5/00* (2006.01)
*H04N 5/217* (2011.01)

(52) U.S. Cl.
CPC ............ *G06T 5/002* (2013.01); *H04N 5/217* (2013.01); *G06T 2200/28* (2013.01); *G06T 2207/20182* (2013.01)

(58) Field of Classification Search
USPC ......... 382/145, 147, 274, 275, 100, 166, 249, 382/240, 303, 304; 348/246; 358/1.9; 380/252; 700/4; 705/51
See application file for complete search history.

(56) References Cited

U.S. PATENT DOCUMENTS

| | | | |
|---|---|---|---|
| 4,281,312 A | 7/1981 | Knudson | |
| 4,680,730 A | 7/1987 | Omoda et al. | |
| 4,783,841 A | 11/1988 | Crayson | |
| 4,850,027 A * | 7/1989 | Kimmel | 382/303 |
| 5,081,573 A | 1/1992 | Hall et al. | |
| 5,226,171 A | 7/1993 | Hall et al. | |

(Continued)

FOREIGN PATENT DOCUMENTS

| | | |
|---|---|---|
| CA | 1236584 A1 | 5/1988 |
| CN | 1078841 A | 11/1993 |

(Continued)

OTHER PUBLICATIONS

No Author Listed, "ARM Architecture Reference Manual," ARMv7-A and ARMv7-R edition, 2734 pages (1996-1998, 2000, 2004-2012).

(Continued)

*Primary Examiner* — Anh Do
(74) *Attorney, Agent, or Firm* — Wilmer Cutler Pickering Hale and Dorr LLP

(57) ABSTRACT

The disclosed embodiments include an apparatus implemented in a semiconductor integrated chip. The apparatus is configured to operate a composite function, comprising a first function and a second function, on a first patch of an image. The apparatus includes a first function operator configured to operate the first function on the group of pixel values to provide a first processed group of pixel values. The apparatus also includes a delay system configured to maintain the first processed group of pixel values for a predetermined period of time to provide a delayed processed group of pixel values. The apparatus further includes a second function operator configured to operate a second function on at least a second processed group of pixels and the delayed processed group to determine an output of the composite function.

20 Claims, 18 Drawing Sheets

(56) References Cited

U.S. PATENT DOCUMENTS

| | | | |
|---|---|---|---|
| 5,262,973 | A | 11/1993 | Richardson |
| 5,434,623 | A | 7/1995 | Coleman et al. |
| 5,861,873 | A | 1/1999 | Kikinis |
| 5,968,167 | A | 10/1999 | Whittaker et al. |
| 6,173,389 | B1 | 1/2001 | Pechanek et al. |
| 6,275,921 | B1 | 8/2001 | Iwata et al. |
| 6,304,605 | B1 | 10/2001 | Haikonen et al. |
| 6,366,999 | B1 | 4/2002 | Drabenstott et al. |
| 6,467,036 | B1 | 10/2002 | Pechanek et al. |
| 6,577,316 | B2 | 6/2003 | Brethour et al. |
| 6,591,019 | B1 | 7/2003 | Comair et al. |
| 6,760,831 | B2 | 7/2004 | Drabenstott et al. |
| 6,839,728 | B2 | 1/2005 | Pitsianis et al. |
| 6,851,041 | B2 | 2/2005 | Pechanek et al. |
| 6,859,870 | B1 | 2/2005 | Kim et al. |
| 6,948,087 | B2 | 9/2005 | Brethour et al. |
| 6,954,842 | B2 | 10/2005 | Drabenstott et al. |
| 7,010,668 | B2 | 3/2006 | Drabenstott et al. |
| 7,038,687 | B2 | 5/2006 | Booth, Jr. et al. |
| 7,124,279 | B2 | 10/2006 | Topham |
| 7,146,487 | B2 | 12/2006 | Drabenstott et al. |
| 7,343,471 | B2 | 3/2008 | Topham |
| 7,366,874 | B2 | 4/2008 | Seong et al. |
| 7,409,530 | B2 | 8/2008 | Kim et al. |
| 7,424,594 | B2 | 9/2008 | Pitsianis et al. |
| 8,538,886 | B1 * | 9/2013 | Iu et al. .................. 705/51 |
| 8,713,080 | B2 | 4/2014 | Moloney |
| 2003/0005261 | A1 | 1/2003 | Sheaffer |
| 2003/0149822 | A1 | 8/2003 | Scott et al. |
| 2003/0154358 | A1 | 8/2003 | Seong et al. |
| 2004/0101045 | A1 | 5/2004 | Yu et al. |
| 2004/0260410 | A1 | 12/2004 | Sakamoto |
| 2005/0036707 | A1 | 2/2005 | Matsuura |
| 2006/0023429 | A1 | 2/2006 | Ribeiro et al. |
| 2007/0291571 | A1 | 12/2007 | Balasundaram |
| 2008/0068389 | A1 | 3/2008 | Bakalash et al. |
| 2010/0302413 | A1 | 12/2010 | Kawashima |
| 2012/0314946 | A1 | 12/2012 | Nomura et al. |

FOREIGN PATENT DOCUMENTS

| | | |
|---|---|---|
| CN | 1326132 A | 12/2001 |
| CN | 101086680 A | 12/2007 |
| DE | 69228442 T2 | 9/1999 |
| DE | 69519801 T2 | 6/2001 |
| DE | 69709078 T2 | 10/2002 |
| DE | 102007025948 A1 | 1/2008 |
| EP | 0240032 A2 | 10/1987 |
| EP | 0245027 A2 | 11/1987 |
| EP | 1158401 A2 | 11/2001 |
| EP | 1241892 A1 | 9/2002 |
| ES | 2171919 T3 | 9/2002 |
| FI | 97096 B | 6/1996 |
| FR | 2835934 A1 | 8/2003 |
| GB | 0710876 A | 6/1954 |
| GB | 1488538 A | 10/1977 |
| GB | 2311882 A | 10/1997 |
| GB | 2362055 A | 11/2001 |
| GB | 2362733 A | 11/2001 |
| GB | 2366643 A | 3/2002 |
| JP | 03042969 B2 | 5/2000 |
| JP | 2002/007211 A | 1/2002 |
| WO | WO-9313628 A1 | 7/1993 |
| WO | WO-96/08928 A1 | 3/1996 |
| WO | WO-9738372 A1 | 10/1997 |
| WO | WO-0022503 A1 | 4/2000 |
| WO | WO-0034887 A1 | 6/2000 |
| WO | WO-0045282 A1 | 8/2000 |
| WO | WO-01/43074 A1 | 6/2001 |
| WO | WO-0184849 A1 | 11/2001 |
| WO | WO-02/51099 A2 | 6/2002 |
| WO | WO-2005/091109 A1 | 9/2005 |
| WO | WO-2008/10634 A1 | 1/2008 |
| WO | WO-2008/087195 A1 | 7/2008 |

OTHER PUBLICATIONS

No Author Listed, "Cortex-A8," Revision r3p2, Technical Reference Manual, 580 pages (2006-2010).

No Author Listed, "Cortex-A9 NEON Media Processing Engine," Revision r3p0, Technical Reference Manual, 49 pages (2008-2011).

No Author Listed, "i.MX 6Dual/6Quad Applications Processor Reference Manual," Rev. 2, 5817 pages (Jun. 2014).

No Author Listed, "MSC8256 Reference Manual," Six Core Digital Signal Processor, Rev. 0, 1272 pages (Jul. 2011).

No Author Listed, "SC140 DSP Core Reference Manual," Rev. 3, 712 pages (Nov. 2001).

Rosten, E. et al., "Machine learning for high-speed corner detection," Department of Engineering, Cambridge University, UK, 14 pages (2006).

Williamson, David, "ARM Cortex A8: A High Performance Processor for Low Power Applications," 23 pages, In Unique chips and systems (Eugene John, Juan Rubio, eds) Boca Raton: CRC Press (2008).

International Search Report and Written Opinion issued by the U.S. Patent and Trademark Office as International Searching Authority for International Application No. PCT/IB14/03104 dated Jun. 25, 2015 (10 pages).

* cited by examiner

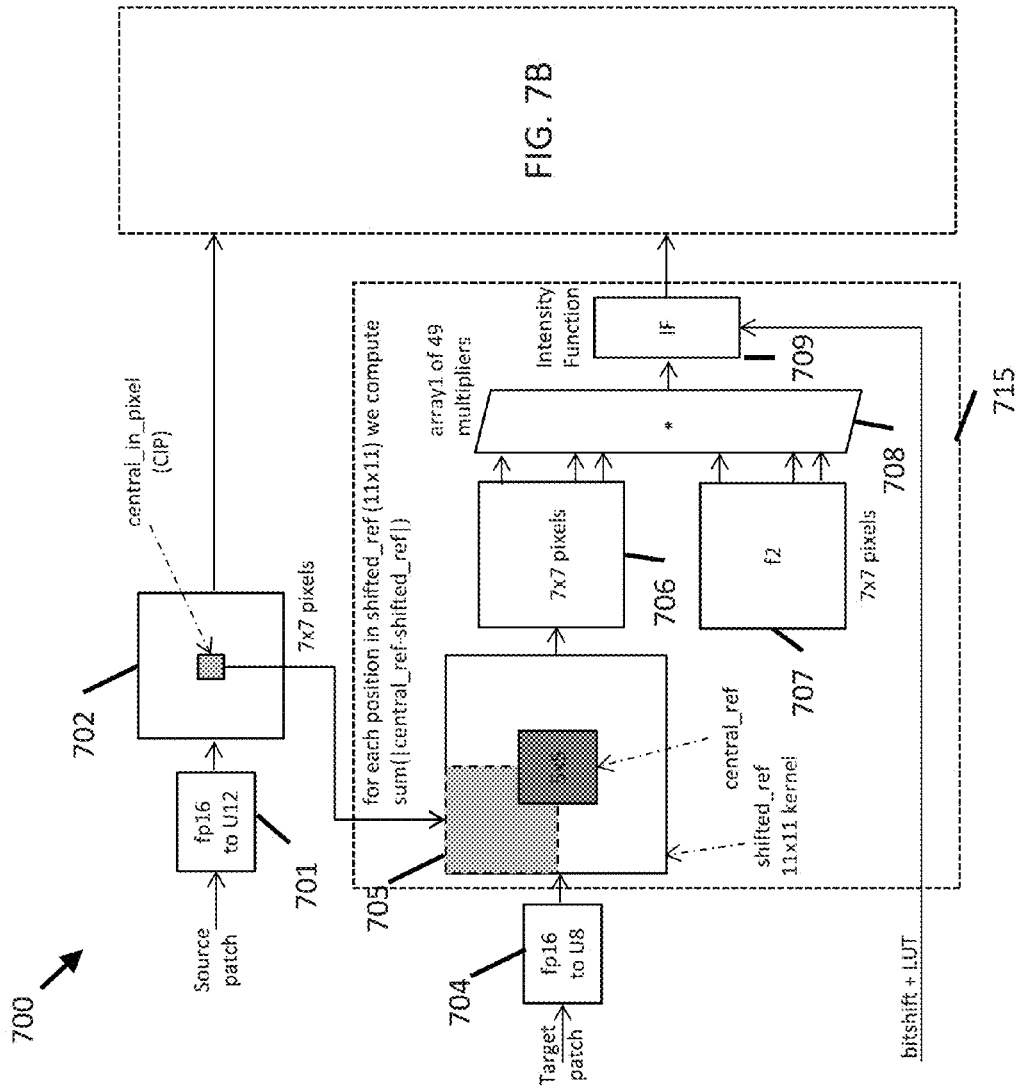

1). $\dfrac{x}{2^n-1} = \dfrac{x}{2^n} + y$

2). $y = \dfrac{x}{2^n-1} - \dfrac{x}{2^n} = \dfrac{2^n x - (2^n-1)x}{2^n(2^n-1)}$ Back-substituting for y yields 3). $\dfrac{x}{2^n-1} = \dfrac{1}{2^n} + \boxed{\dfrac{x}{2^n-1}} \cdot \dfrac{1}{2^n}$ 4). $\dfrac{x}{2^n-1} = \dfrac{x}{2^n} + \dfrac{1}{2^n}\left[\dfrac{x}{2^n} + \boxed{\dfrac{x}{2^n-1}} \cdot \dfrac{1}{2^n}\right]$ Expand this term repeatedly until required accuracy is reached 5). $\dfrac{x}{2^n-1} = \dfrac{x}{2^n} + \dfrac{x}{2^{2n}} + \dfrac{1}{2^n}\left[\boxed{\dfrac{x}{2^n-1}}\right]$

FIG. 11

APPARATUS, SYSTEMS, AND METHODS FOR REMOVING NOISE FROM AN IMAGE

FIELD OF THE APPLICATION

The present application relates generally to image processing. In particular, the present application relates to providing hardware support to image processing applications.

BACKGROUND

Images taken by digital cameras can include noisy pixel values, and the noisy pixel values can be detrimental to visual quality of an image. Such image noise can result from various sources. For example, image noise can result from the manner in which photons arrive at sensors in digital cameras (e.g., Poisson photon noise). As another example, image noise can result from electronic components in digital cameras. In particular, the image sensor and/or electronics in digital cameras can generate noise when they capture and process the received photons. Image noise from these various sources can be further accentuated by the post-processing of captured images. For example, the image noise can be amplified by contrast enhancement techniques or blur removal techniques.

There have been attempts to remove image noise from captured images. The image noise removal process is sometimes referred to as denoising. A simple denoising process includes replacing the noisy pixel value with an average of values in the neighboring pixels. The averaging operation can reduce the standard deviation of the noise power in a pixel value by the square root of the number of pixels included in the averaging process. The denoising process can also be based on a filtering operation. For example, a noisy image can be filtered using a Gaussian filter or a Wiener filter to remove high frequency content from the noisy image.

However, these denoising processes do not necessarily improve the image quality of the denoised image. In the case of the simple average-based denoising process, the key challenge is to find pixels with similar properties in the neighborhood, which is often difficult. In the case of the filtering-based denoising process, while the filtering process can remove high frequency noise from the noisy image, the filtering process can be ineffective in removing low frequency noise. Furthermore, if the underlying noise-free image contains high-frequency contents (e.g., fine details and structures), then the filtering process would remove the high-frequency image contents as well as the noise, thereby reducing the quality of the noise-removed image. Therefore, there is a need to improve the denoising process.

SUMMARY

The disclosed embodiments include an apparatus implemented in a semiconductor integrated chip. The apparatus is configured to operate a composite function, comprising a first function and a second function, on a first patch of an image. The apparatus includes a first function operator configured to receive, at a first cycle of a clock signal, a group of pixel values associated with the first patch of the image and operate the first function on the group of pixel values to provide a first processed group of pixel values. The apparatus also includes a delay system configured to receive, at a second cycle of the clock signal, the first processed group of pixel values from the first function operator and maintain the received first processed group of pixel values for a predetermined period of time to provide a delayed processed group of pixel values. The apparatus further includes a second function operator configured to receive, from the first function operator at a third cycle, a second processed group of pixel values and, from the delay system, the delayed processed group of pixel values, and operate a second function on at least the second processed group and the delayed processed group to determine an output of the composite function on the first patch of the image.

In some embodiments, the delay system comprises at least one register.

In some embodiments, the group of pixel values comprises a column of the first patch in the image.

In some embodiments, when the first patch of the image comprises N columns, the delay system is configured to provide N−1 delayed processed groups of pixel values in the first patch to the second function operator, wherein each of the N−1 delayed processed groups are delayed by a different amount of time, and wherein the second function operator is configured to operate the second function on the second processed group and each of the N−1 delayed processed groups to determine the output of the composite function.

In some embodiments, when the first patch of the image comprises N columns, the delay system is configured to provide a single delayed processed group of pixel values in the first patch to the second function operator, wherein the delayed processed group is delayed by N clock cycles, and wherein the second function operator is configured to operate the second function on the second processed group, the single delayed processed group, and a previous output of the composite function to provide the output of the composite function on the first patch of the image.

In some embodiments, the group of pixel values comprises a row of the first patch in the image.

In some embodiments, when the first patch of the image comprises N rows, the delay system is configured to provide N−1 delayed processed groups of pixel values in the first patch to the second function operator, wherein each of the N−1 delayed processed groups are delayed by a different amount of time, and wherein the second function operator is configured to operate the second function on the second processed group and each of the N−1 delayed processed groups to determine the output of the composite function.

In some embodiments, when the first patch of the image comprises N rows, the delay system is configured to provide a single delayed processed group to the second function operator, wherein the delayed processed group is delayed by N clock cycles, and wherein the second function operator is configured to operate the second function on the current processed group, the single delayed processed group, and a previous output of the composite function to provide the output of the composite function on the first patch of the image.

In some embodiments, the first function operator is configured to compute a summation of squared difference between a reference value and each one of the group of pixel values.

In some embodiments, the second function operator is configured to compute a summation of at least the second processed group and the delayed processed group to determine the output of the composite function.

In some embodiments, the second function operator is configured to compute a difference of at least the second processed group and the delayed processed group to determine the output of the composite function.

In some embodiments, the apparatus further includes a third function operator operating in parallel with the second function operator, wherein the third function operator is configured to provide an output of the composite function on a second patch of the image that overlaps, in part, with the first patch of the image.

The disclosed embodiments include a method for operating a composite function, comprising a first function and a second function, on a first patch of an image using an apparatus implemented in a semiconductor integrated chip. The method includes receiving, at a first function operator of the apparatus at a first cycle of a clock signal, a group of pixel values associated with the first patch of the image and operating the first function on the group of pixel values to provide a first processed group of pixel values. The method also includes receiving, at a delay system of the apparatus at a second cycle of the clock signal, the first processed group of pixel values from the first function operator and maintaining the received processed group of pixel values for a predetermined period of time to provide a delayed processed group of pixel values. The method further includes operating, at a second function operator of the apparatus at a third cycle of the clock signal, a second processed group of pixel values received from the first function operator and the delayed processed group received from the delay system to determine an output of the composite function on the first patch of the image.

In some embodiments, when the first patch of the image comprises N columns, the method further comprises providing, by the delay system, N−1 delayed processed groups of pixel values in the first patch to the second function operator, wherein each of the N−1 delayed processed groups are delayed by a different number of clock cycles; and operating, by the second function operator, the second function on the second processed group and all of the N−1 delayed processed groups to determine the output of the composite function.

In some embodiments, when the first patch of the image comprises N columns, the method further comprises providing, by the delay system, a single delayed processed group to the second function operator, wherein the delayed processed group is delayed by N clock cycles; and operating, by the second function operator, the second function on at least the second processed group, the single delayed processed group, and a previous output of the composite function to provide the output of the composite function on the first patch of the image.

In some embodiments, the group of pixel values comprises a row of the first patch in the image.

In some embodiments, when the first patch of the image comprises N rows, the method further comprises providing, by the delay system, N−1 delayed processed groups of pixel values in the first patch to the second function operator, wherein each of the N−1 delayed processed groups are delayed by a different number of clock cycles; and operating, by the second function operator, the second function on the second processed group and all of the N−1 delayed processed groups to determine the output of the composite function.

In some embodiments, when the first patch of the image comprises N rows, the method further comprises providing, by the delay system, a single delayed processed group to the second function operator, wherein the delayed processed group is delayed by N clock cycles; and operating, by the second function operator, the second function on at least the second processed group, the single delayed processed group, and a previous output of the composite function to provide the output of the composite function on the first patch of the image.

In some embodiments, operating the first function comprises computing a summation of squared difference between a reference value and each one of the group of pixel values in parallel.

In some embodiments, operating the second function comprises computing a summation of at least the second processed group and the delayed processed group to determine the output of the composite function.

The disclosed embodiments include an apparatus implemented in a semiconductor integrated chip for denoising a pixel in an image. The apparatus includes a similarity metric computation block configured to determine a similarity metric between a source image patch, comprising the pixel, and one of a plurality of target image patches. The similarity metric computation block comprises a first function operator configured to receive, at a first cycle of a clock signal, a group of pixel values associated with the one of the target image patches and operate the first function on the group of pixel values and a value of the pixel in the source image patch to provide a first processed group of pixel values; a delay system configured to receive, at a second cycle of the clock signal, the first processed group of pixel values from the first function operator and maintain the first processed group of pixel values for a predetermined period of time to provide a delayed processed group of pixel values; and a second function operator configured to receive the second processed group of pixel values from the first function operator and the delayed processed group of pixel values from the delay system, and operate a second function on at least the second processed group and the delayed processed group to provide the similarity metric between the source image patch and the one of the target image patches. The apparatus further includes a weighted average block configured to average the value of the pixel with a corresponding value in the one of the target image patches in accordance with the similarity metric to provide a denoised value for the pixel in the image.

The disclosed embodiments include an apparatus implemented in a semiconductor integrated chip for denoising a pixel in an image. The apparatus includes a first representation converter configured to receive a first source image patch represented in a floating-point representation and convert the first source image patch to a second source image patch represented in an unsigned representation; a second representation converter configured to receive a first target image patch represented in a floating-point representation and convert the first targets image patch to a second target image patch represented in an unsigned representation; and a similarity metric computation block configured to determine a similarity between the second source image patch, comprising the pixel, and the second target image patch. The similarity metric computation block can include a processing block configured to compute a difference between a value of the pixel in the second source image patch and at least a portion of the second target image patch; an intensity function block configured to compute an approximation of a square of the difference between the value of the pixel in the second source image patch and the portion of the second target image patch using a bit-shift operator and a lookup table; and a summation block configured to compute the similarity between the second source image patch and the second target image patch based on the squared difference between the value of the pixel in the second source image patch and the portion of the second target image patch. The apparatus can also include a weighted average block configured to average the value of the pixel in the second source image patch with a corresponding value in the one of the second target image patches in accordance with the similarity to provide a denoised value for the pixel in the image.

In some embodiments, the apparatus can also include a third representation converter configured to convert a numerical representation of the denoised value for the pixel from an unsigned representation to an floating-point representation.

In some embodiments, the third representation converter is configured to convert the numerical representation iteratively.

In some embodiments, values in the lookup table are pre-computed based on a Gaussian function.

In some embodiments, values in the lookup table are pre-computed based on a polynomial function.

In some embodiments, the intensity function block further comprises a patch-to-integer converter that converts the difference between the value of the pixel in the second source image patch and the at least a portion of the second target image patch into a single value represented as a plurality of bits.

In some embodiments, a predetermined set of the plurality of bits from the single value is used as an index to the LUT.

DESCRIPTION OF DRAWINGS

FIGS. 7A-7B illustrate an NLM system in accordance with some embodiments.

FIG. 11 illustrates a mechanism for converting an unsigned integer to a floating-point value in accordance with some embodiments.

DETAILED DESCRIPTION

The present disclosure relates to an improved denoising process referred to as the non-local means (NLM) technique.

The NLM technique assumes that a patch of an image (e.g., a rectangular portion or a crop of an image including a plurality of pixels) is similar to other patches in the same image. At a high level, the NLM technique performs the following steps to denoise a reference pixel having noise. As an initial step, the NLM technique identifies a source image patch around the reference pixel. Then, the NLM technique identifies one or more target image patches that are similar to the source image patch. During this process, the NLM technique can also determine the degree of similarity between the source image patch and the one or more target image patches. Then lastly, the NLM technique computes a weighted average of the one or more target image patches and the source image patch based on the degree of similarity between the target image patches and the source image patch. The central pixel value of the weight-averaged image patches becomes the denoised reference pixel value.

Figure 1:
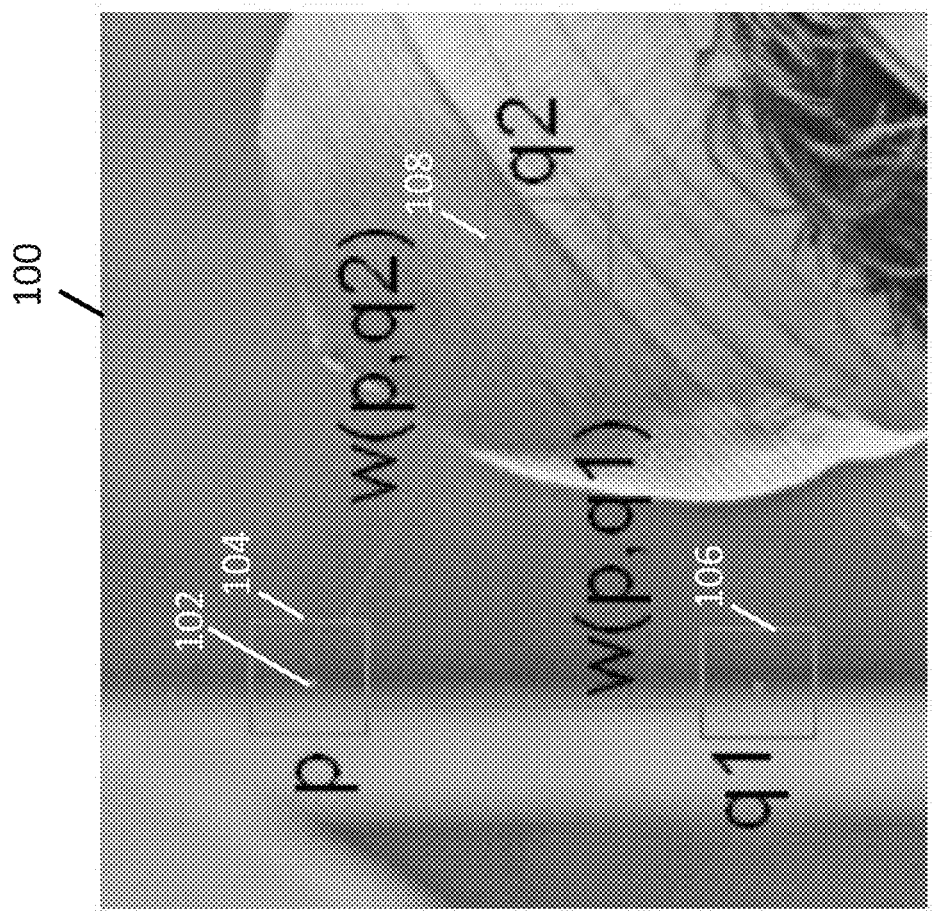
FIG. 1 illustrates a non-local means (NLM) denoising process.

FIG. 1 illustrates the NLM denoising process. To denoise a reference pixel 102 in the image 100, the NLM technique can identify a source image patch 104 around the reference pixel 102. Then, the NLM technique can identify target image patches 106, 108 that are relatively similar to the source patch 104. This process can include computing a similarity metric between the source image patch 104 and the target image patches 106, 108. For example, the NLM technique can include computing a sum-of-squared difference between pixels in the source image patch 104 and pixels in the target image patch 106 and/or 108.

Subsequently, the NLM technique can perform the weighted averaging of the source image patch 104 and the target image patches 106, 108 based on the similarity metric associated with the target image patches 106, 108 to determine the denoised reference pixel value. Since the target image patch 106 is visually more similar to the source patch 104 compared to the target image patch 108, the target image patch 106 can have a stronger influence on the denoised reference pixel value than the target image patch 108 (e.g., the weight associated with the target image patch 106 can be higher than the weight associated with the target patch 108).

Because similar pixels or patches can be found anywhere in the image, the NLM technique can scan the whole image to identify target image patches to perform the weighted averaging. In some embodiments, the NLM technique can use only some patches in the image to perform the weighted averaging. For example, the NLM technique can discard patches in the image that have lower similarity than a predetermined threshold. In other embodiments, the NLM technique can use all patches in the image to perform the weighted averaging.

As discussed above, the weights for the weighted average operation can be based on the similarity between a source image patch and a target image patch. The similarity between a source image patch and a target image patch can be determined by computing a difference between the source image patch and the target image patch. In some cases, the difference can be based on a simple sum of squared difference of pixel values in the source image patch and the target image patch. In other cases, the difference can be based on weighted sum of squared difference of pixel values in the source image patch and the target image patch.

Mathematically, the NLM denoising technique can be expressed as:

$$NLu(p) = \frac{1}{C(p)} \int f(d(B(p), B(q))u(q)dq$$

where B(p) is a set of pixel values corresponding to a source image patch around the reference pixel p, B(q) is a set of pixel values corresponding to a target image patch around the pixel q, u(q) is a pixel value at pixel q, d(B(p),B(q)) is the similarity metric between B(p) and B(q), if is a decreasing function, and C(p) is the normalization factor.

While the NLM technique offers good performance in terms of image quality, the NLM technique is computationally expensive because it computes a similarity metric between the source patch and every target image patch, which may include all image patches in the image. Furthermore, most of the similarity metric computations are performed serially. Therefore, the similarity metric computations can be both complex and time consuming.

To reduce the computational complexity, the original NLM technique has been refined to use smaller target image patches with better locality and hence better power and performance. This revised version of the NLM technique is based on the observation that when computing the similarity metric f(d(B(p),B(q))), all pixels in the patch B(p) have the same importance. Therefore, the weight f(d(B(p),B(q))) can be used to denoise not only the pixel p, but also other pixels in the patch B(p).

The present disclosure provides hardware support to improve the computational efficiency of similarity metric computations (e.g., f(d(B(p),B(q)))) in the NLM operation. In particular, the present disclosure provides a computational reuse mechanism for sharing portions of similarity metric computations amongst neighboring target image patches. The present disclosure also provides a mechanism for adjusting the arithmetic representation and precision of the similarity metric computations. This way, the similarity metric computations can provide a desired performance at a reduced cost in terms of power consumption and computational delay.

Figure 2:
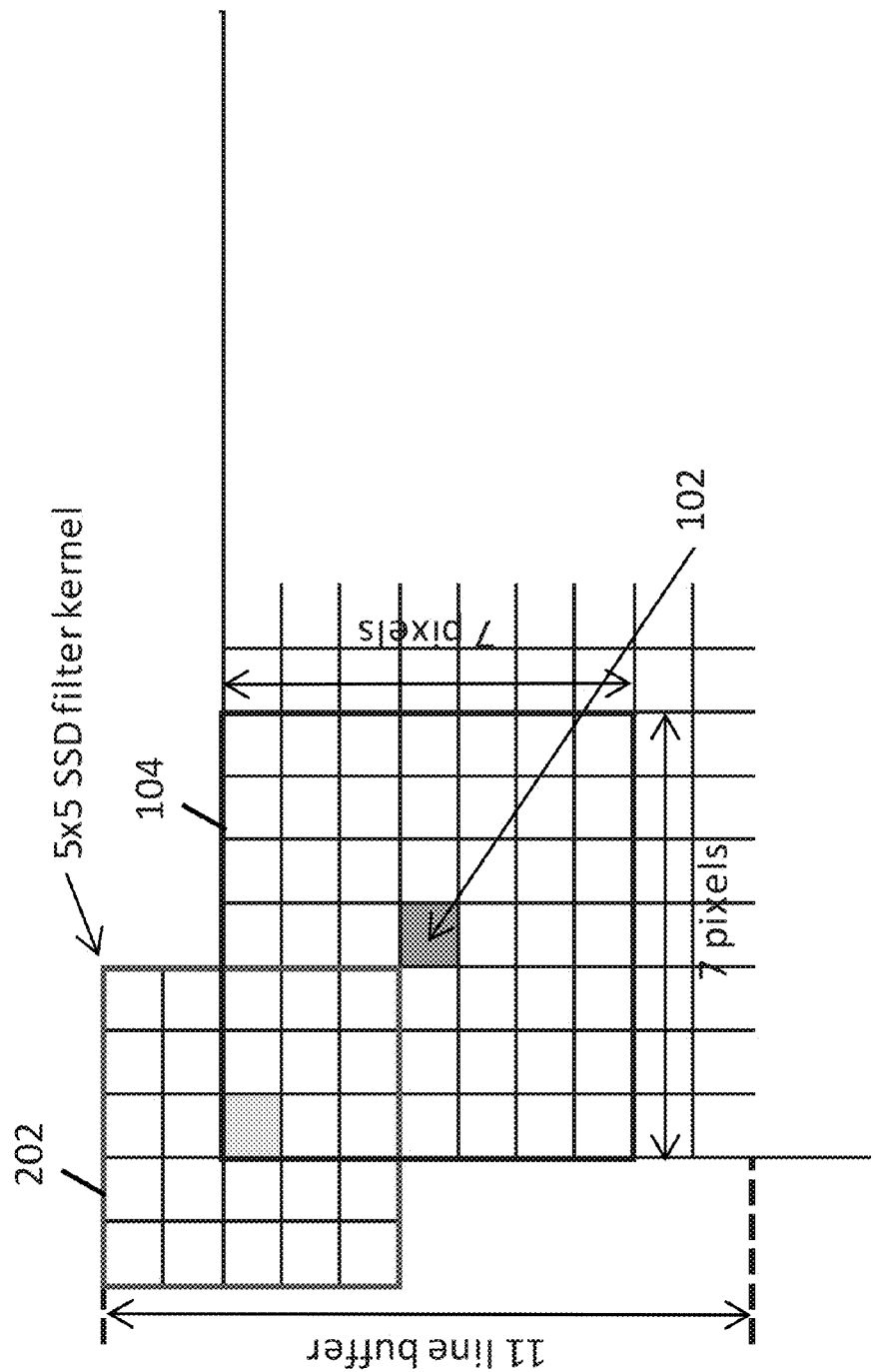
FIG. 2 illustrates a process for computing a similarity metric for the NLM denoising process in accordance with some embodiments.

FIG. 2 illustrates a process for computing a similarity between a source image patch and a target image patch in accordance with some embodiments. In this illustration, the image includes a source image patch 104 including the reference pixel 102. The NLM system is configured to determine a similarity between the source image patch 104 and target image patches, one of which is illustrated as 202. The target image patches can include all sliding-windows of the underlying image. For example, the set of all target image patches can be generated by the following process. First, a first target patch can be extracted by sampling the image using a N×N window at a first location. Then, the N×N window can be moved to the right by a predetermined number of pixels, e.g., 1 pixel, and a second target patch can be extracted by cropping the image at the new location of the N×N window. This process can be iterated to generate the set of target image patches comprising sliding windows of the underlying image. The target image patches can be the same size as, larger than, or smaller than the source patch 102.

In some embodiments, the similarity between a source image patch and a target image patch can be computed by computing a sum of squared difference (SSD) between pixel values in the source image patch and pixel values in the target image patch. Conventionally, the SSD operation can be time-consuming. The SSD operation involves computing a difference between a value of a pixel in the source patch 104 and a value of a corresponding pixel in the target patch 202. Therefore, when the target image patch has a size of 5×5 pixels, then the total number of subtraction operations is 25 (i.e., 5×5) and the total number of square operations (i.e., multiplication operations) is also 25. This operation is performed for every pixel position in the source image patch (which includes 7×7 pixels). Therefore, the total number of subtraction operations during the SSD operation can be as high as 1225 (i.e., 7×7× 5×5) and the total number of square operations during the SSD operation can also be as high as 1225 (i.e., 7×7×5×5), totaling 2450 arithmetic operations (i.e., 1225 subtraction operations+1225 square operations). Performing 2450 arithmetic operations in series can be extremely time-consuming.

The disclosed embodiments provide an effective hardware mechanism for performing the SSD operations. One of the benefits of the disclosed hardware mechanism is derived from a computational reuse mechanism. As discussed earlier, the target image patches can include sliding-windows of the underlying image. For example, the target image patches can include pixels that are cropped from the underlying image by sliding a fixed size window over the underlying image by a predetermined number of pixels. Therefore, once the NLM system performs an SSD operation on a first target image patch, the NLM system slides the window by a predetermined number of pixels (e.g., one pixel) to define a second target image patch and re-performs the SSD operation on the second target image patch. The key observation is that the first target patch and the second target patch are overlapping.

Figure 3:
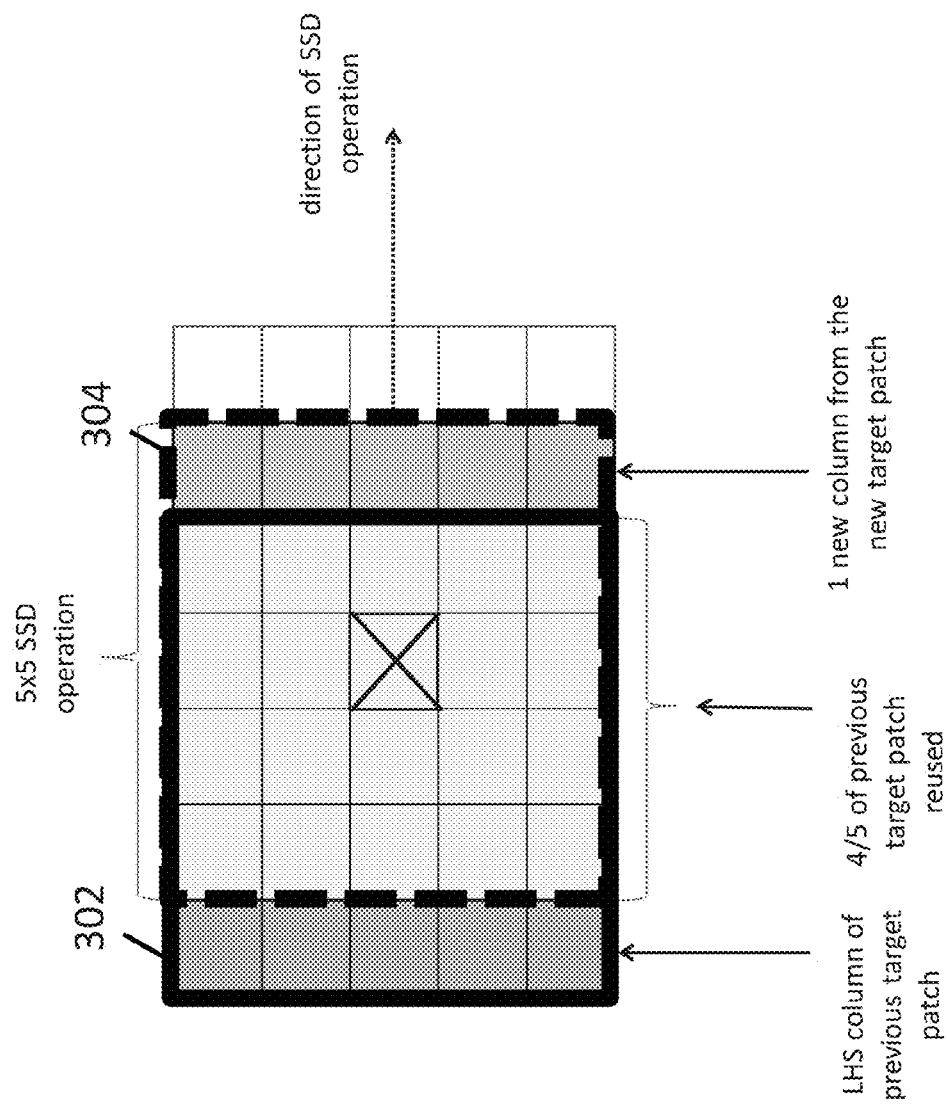
FIG. 3 illustrates an overlapping nature of target patches for the NLM denoising process in accordance with some embodiments.

FIG. 3 illustrates the overlapping nature of target image patches in accordance with some embodiments. FIG. 3 illustrates a target image patch as a 5×5 pixel window. When the NLM system completes the SSD operation on the first target patch 302, the NLM system can shift the window by one pixel to the right, and define a second target patch 304. Because the first target patch 302 and the second target patch 304 overlap for four of the five columns, in some embodiments, the SSD operation performed on the first target patch 302 can be reused in performing the SSD operation on the second target patch 304. For example, the NLM system can perform the SSD operation in two steps: the first step involving an independent SSD operation on each of the columns, and the second step involving a summation operation on the output of the first step (e.g., the SSD of the columns). In this case, the NLM system can reuse the output of the first step for four overlapping columns, which can be computed during the SSD operation on the first patch 302, when performing the SSD operation on the second patch 304. Such computational reuse can reduce the computational requirement by up to 80%. In the particular example provided above, the disclosed NLM system can perform 2450 arithmetic operations in parallel at higher than 600 mega-pixels/second, for example 800 mega-pixels/second or 1 giga-pixels/second, which is significantly faster than the existing implementations.

Figure 4A:
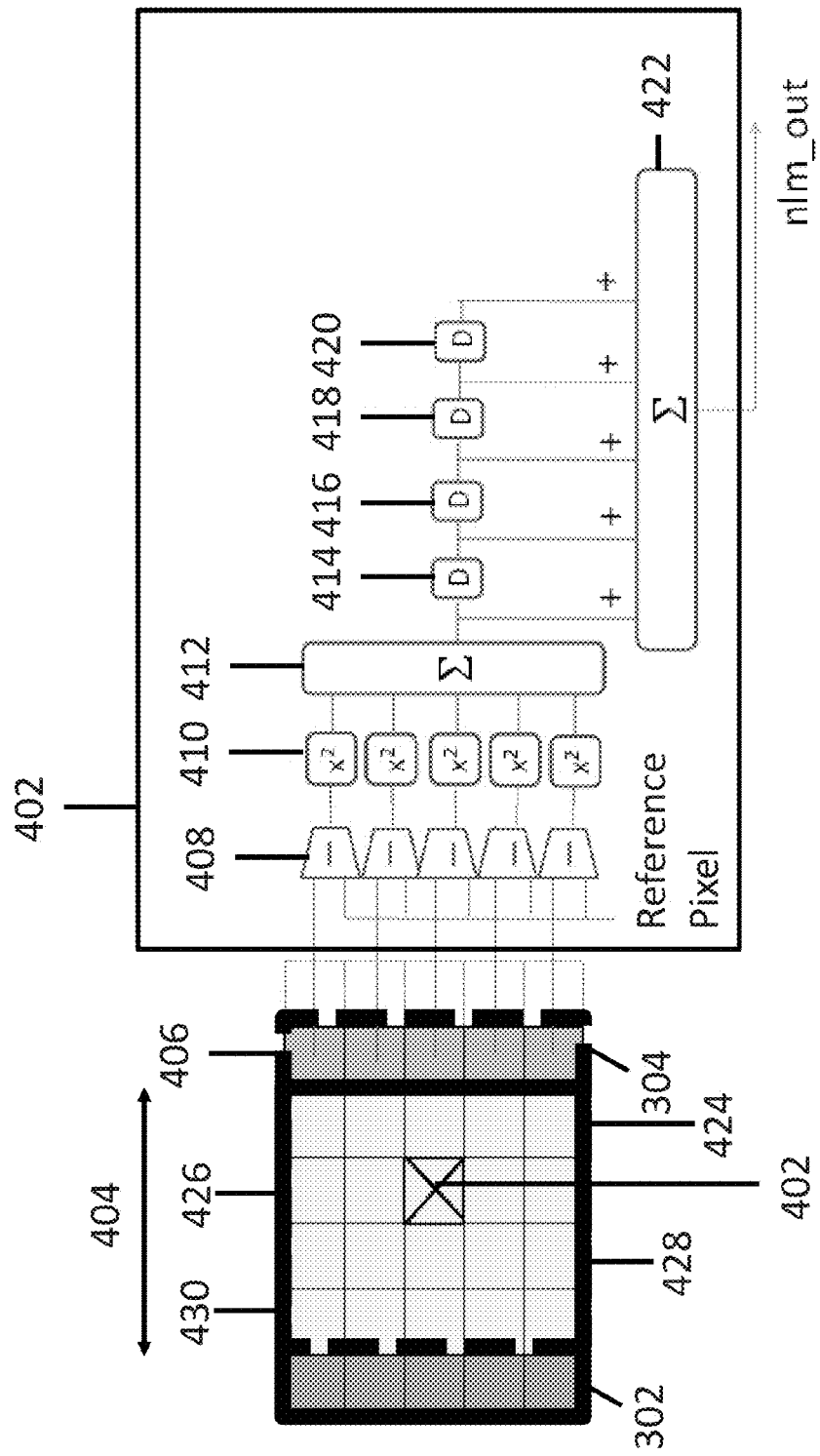
FIGS. 4A-4B illustrate a sum-of-squared-difference (SSD) block for the NLM denoising process in accordance with some embodiments.

FIG. 4A illustrates an SSD block of an NLM system in accordance with some embodiments. The disclosed SSD block 402 can be configured to reuse computations for performing SSD operations. In this illustration, the SSD block 402 can be configured compute a sum of squared differences between the reference pixel and the second patch 304. The SSD block 402 can leverage the column-wise overlap: of the five columns in the second patch 304, four of columns 404 overlap with the earlier-processed first patch 302. For example, the SSD block 402 is configured to compute the SSD of only the new column 406, and add the SSD of the new column 406 to the previously computed SSD of the four columns 404, thereby reusing the previously computed SSD of the four columns 404. This allows the SSD block 402 to obviate re-computing the SSD of the four columns 404.

More generally, the SSD block 402 can be configured to compute a sum-of-squared differences as a composite function comprising a first function and a second function. For example, an image patch can include an N×M grid of pixels. The first function can be configured to compute a sum of squared differences between the reference pixel value and one of the columns in the N×M grid of an image patch. The first function can be operated on each of the columns in the image patch independently, thereby generating N values, one value per column. Then, the second function can be configured to compute a summation of the N values from the first function, thereby computing sum-of-squared differences between the reference value and the pixels in the image patch. When the SSD block 402 operates the first function on a column of the target patch one at a time per clock cycle, the SSD block 402 can maintain the output of the first function in a delay system so that the output of the first function can be used in the future when operating the second function.

The SSD block 402 includes a first function operator, which can include a plurality of subtractors 408, a plurality of multipliers 410 configured to perform the square operation, and a first summation block 412. Each subtractor 408 can be configured to compute a difference between the reference pixel and one of the pixels in the new column 406. Once the subtractor 408 provides the difference to a multiplier 410, the multiplier 410 can be configured to compute a squared value of the difference and provide the squared value to the first summation block 412. The first summation block 412 subsequently adds the squared difference values from each pixel, and provides it to the delay system and a second summation block 422. In some embodiments, all these operations can be performed within a single clock cycle.

The SSD block 402 also includes a delay system. The delay system can include a plurality of delay elements 414, 416, 418, 420. Each delay element 414, 416, 418, 420 in the delay system can be configured to delay the output of the first summation block 412 (i.e., the output of the first function operator) by a predetermined number of clock cycles. If the predetermined number of clock cycles is one clock cycle, when the first summation block 412 outputs the SSD of the new column 406, the output of the first delay element 414 provides the SSD of the column 424, the output of the second delay element 416 provides the SSD of the column 426, the output of the third delay element 418 provides the SSD of the column 428, and the output of the fourth delay element 420 provides the SSD of the column 430. Thus, the second function operator, which includes the second summation block 422, can receive the SSD of all columns in the second patch 304, and provide, at the output, the SSD of all pixels in the second patch 304. This SSD output of the second summation block 422 (i.e., the output of the composite function comprising the first function and the second function) becomes the SSD value for the center pixel 402 of the second patch 304. In the next cycle, the target patch is shifted to the right by one pixel, and the above process is repeated for the new column in the new target patch. In some embodiments, the delay element 414, 416, 418, 420 can be implemented using a register or a clocked flip-flop.

Figure 4B:
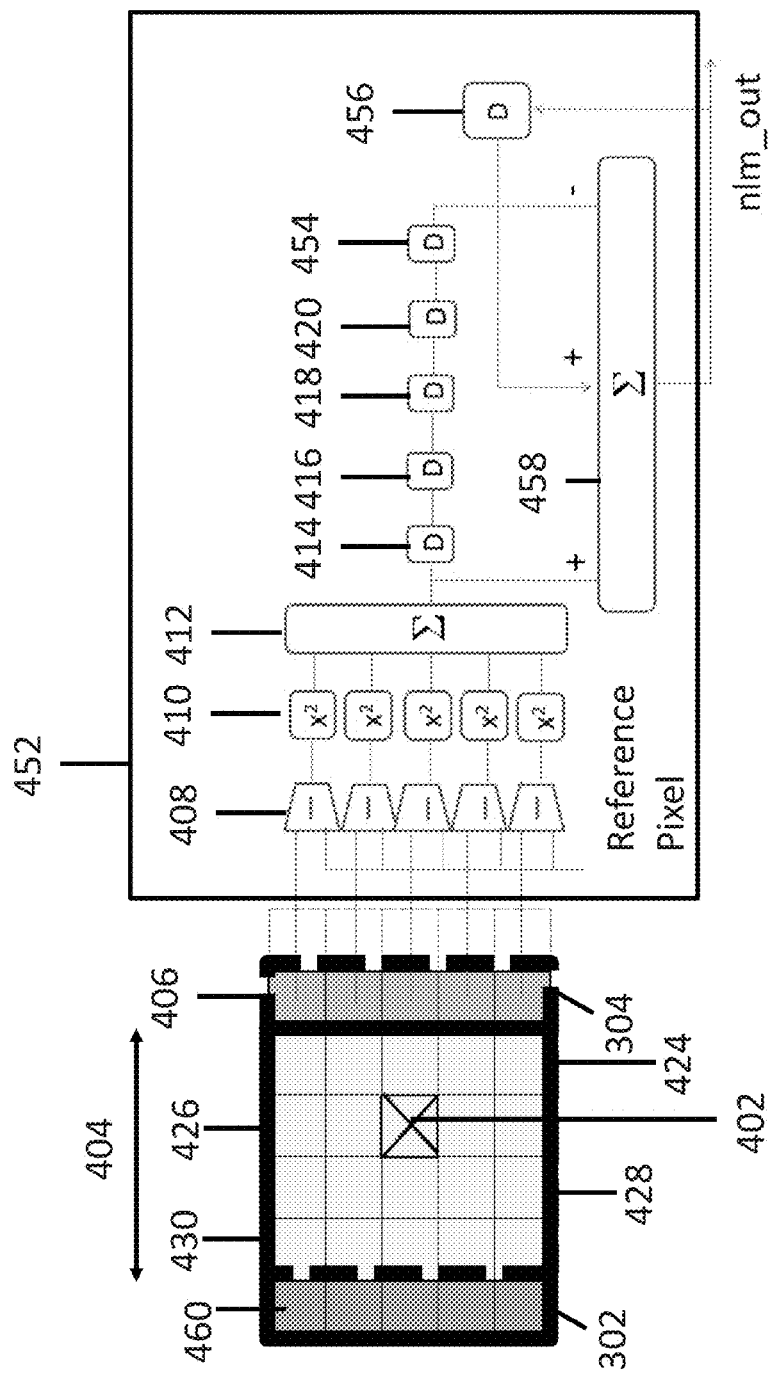

In some embodiments, the SSD block 402 can be configured to implement the computational reuse mechanism in a different manner. FIG. 4B illustrates the operation of a SSD block in accordance with some embodiments. The SSD block 452 in FIG. 4B can be functionally equivalent to the SSD block 402 of FIG. 4A. In this implementation, the SSD block 452 can be configured to compute the SSD of the current target patch 304 by adding (1) the total SSD output of the previous target patch 302 and (2) the SSD of the new column 406, and subtracting (3) the SSD of the left-most column 460 of the previous target patch 302. In this implementation, the first function operator remains identical to the SSD block 402. However, the SSD block 452 uses two additional delay elements 454, 456 in the delay system. Also, the SSD block 452 uses a simpler second summation block 458 (i.e., a second function operator) with only three inputs, as opposed to a summation block with 5 inputs. This implementation of the SSD block 452 can be more efficient compared to the SSD block 402 when the size of the target patch is large because implementing a summation block, such as the second summation block, with a large number of inputs is challenging and energy-consuming.

In some embodiments, the SSD blocks 402, 452 can be used to address row-wise overlap of target patches. For example, the target patch can be flipped across its diagonal before being provided to the SSD blocks 402, 452.

Figure 5A:
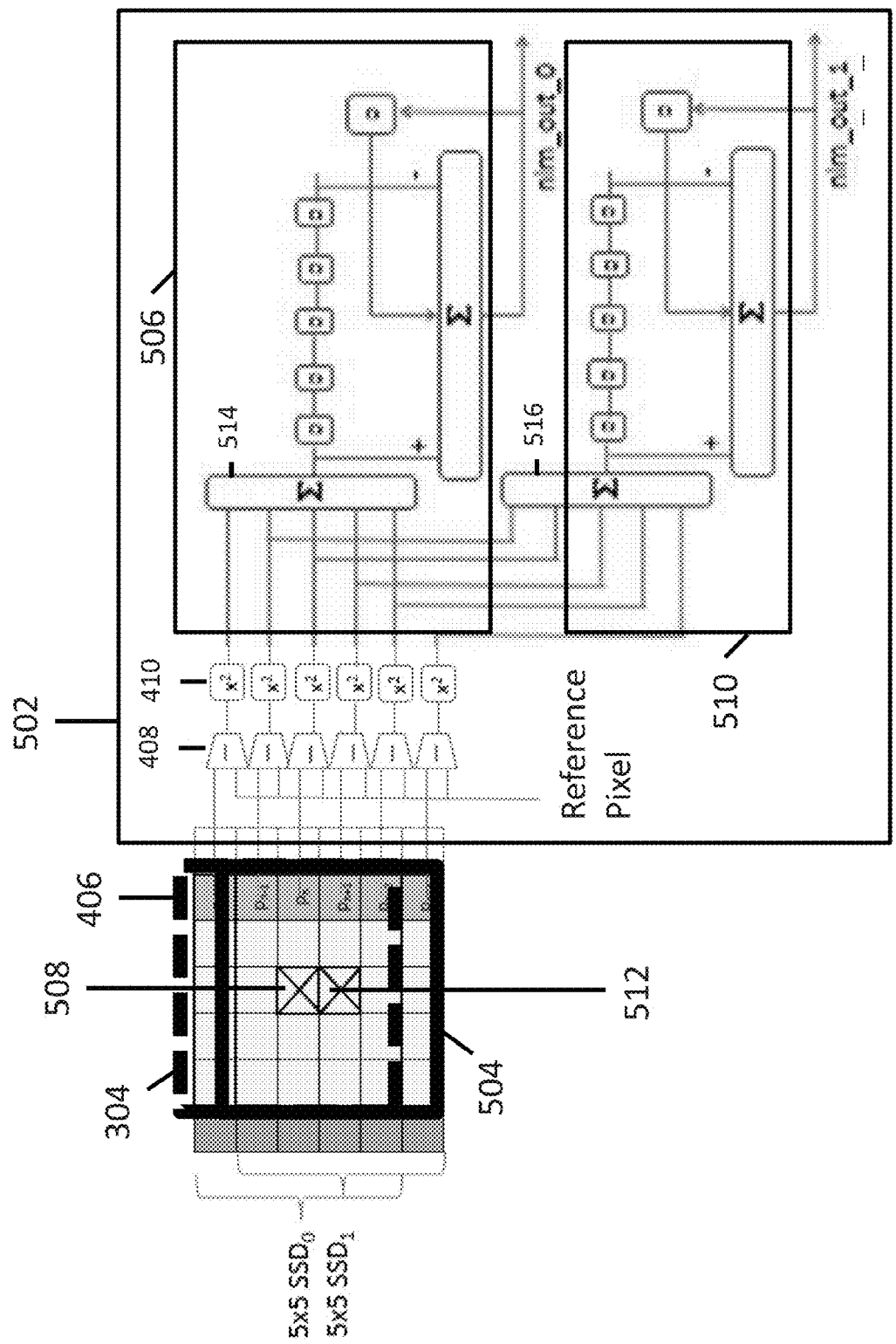
FIGS. 5A-5B illustrate an SSD block based on both the column-wise overlap and the row-wise overlap of target patches in accordance with some embodiments.
Figure 5B:
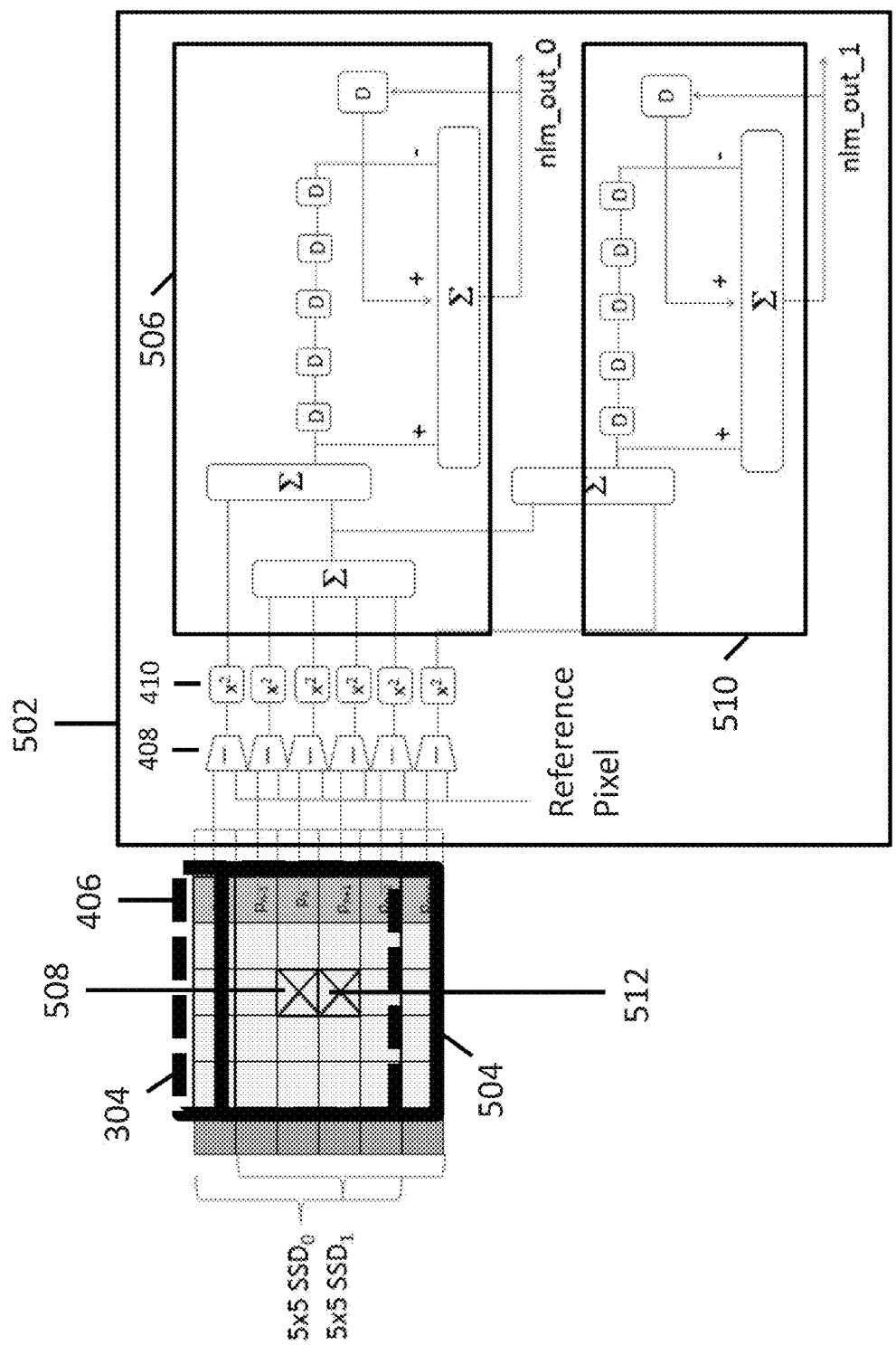

In some embodiments, an SSD block can be configured to reuse computation to leverage both the column-wise overlap and the row-wise overlap. FIG. 5A illustrates an SSD block that can leverage both the column-wise overlap and the row-wise overlap in the target patches in accordance with some embodiments. The row-wise computation reuse is based on an observation that four of the five pixels in the new column 406 are shared by two target patches 304, 504. Therefore, the SSD block 502 can use one additional subtractor in the plurality of subtractors 408 and one additional multiplier in the plurality of multipliers 410 to leverage this row-wise overlap. In some embodiments, the SSD block 502 includes a top SSD block 506 configured to provide an SSD value for the first central pixel 508, and a bottom SSD block 510 configured to provide an SSD value for the second central pixel 512. Therefore, a single SSD block 502 can compute the SSD value for two target patches 304, 504 in a single cycle. The row-wise overlap allows the NLM system to use a clock operating at a low frequency (e.g., 300 MHz) to achieve a high throughput (e.g., 600 Mega-pixel/second), thereby trading off area for a higher throughput, at a lower power dissipation. FIG. 5B shows a similar implementation of the SSD block, but with summation blocks 514, 516 having less number of inputs.

In some embodiments, the SSD blocks disclosed in FIGS. 4-5 can be extended to compute the SSD of 3 or more target patches in parallel. This allows the system to strike a trade-off between the chip area and the computational throughput and power consumption.

Figure 6:
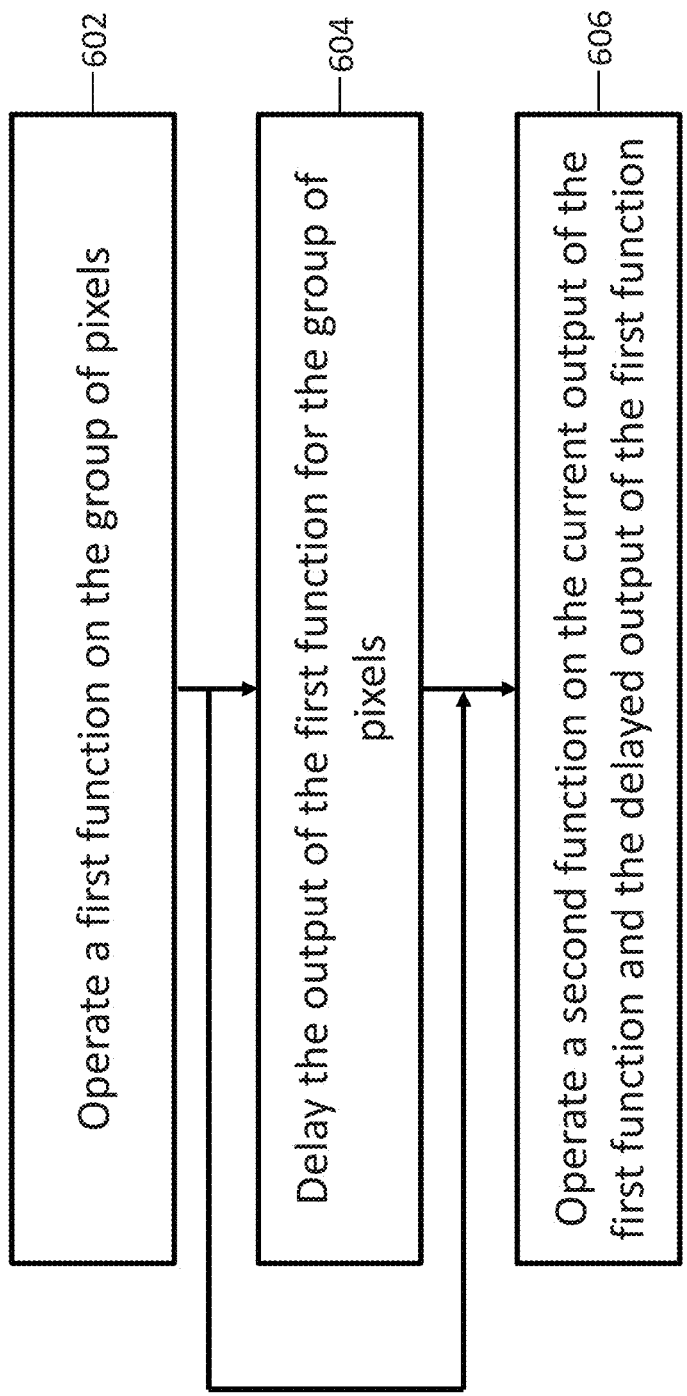
FIG. 6 illustrates a process for computing a SSD in accordance with some embodiments.

FIG. 6 illustrates a process of operating an SSD block implemented in an integrated chip in accordance with some embodiments. FIG. 6 can be implemented using a pipelined architecture in which each of the steps are performed simultaneously at each clock cycle.

In step 602, in the first clock cycle, the first function operator, which can include one or more of the plurality of subtractors 408, a plurality of multipliers 410, and a summation block 412, can receive a column (or a row) of a target image patch and perform the subtraction, multiplication, and summation operations on the received column (or row) of the target image patch.

In step 604, in the second clock cycle, the delay block, which can include some or all of the delay elements 414, 416, 418, 420, 454, can delay the output from the first function operator by a predetermined period of time. The predetermined period of time can be a function of a size of the target image patch. For example, when the size of the target image patch is N×N pixels, then the predetermined period of time can be N−1. As another example, when the size of the target image patch is N×N pixels, then the predetermined period of time can be N. In some embodiments, when the size of the target image patch is N×N pixels, then the delay block can be configured to provide N−1 delayed outputs of the first function. Each of the N−1 delayed outputs can be a delayed version of the first output operator, but by a different delay amount.

In step 606, in a third clock cycle, a second function operator, which includes the second summation block 422 or 458, can receive the current output of the first function operator and the delayed output(s) of the first function operator, and operate a second function on the current output of the first function operator and the delayed output(s) of the first function operator. This way, the second function operator can provide an output of the composite function comprising the first function and the second function.

The disclosed SSD blocks can be used in an NLM system to denoise a pixel in an image. For example, the NLM system can include the SSD blocks as disclosed above in accordance with some embodiments. The NLM system can also include a weighted average block that is configured to average the value of the noisy pixel with a corresponding central pixel value in one of the target image patches in accordance with the similarity metric to provide a denoised value for the noisy pixel.

In some embodiments, an NLM system can be configured to compute the similarity metric for a target patch based on a weighted SSD between the source patch 104 and the target patch 106, 108. In such embodiments, the NLM system can include a weighted SSD block. The weight applied to the squared difference can be considered a kernel. The kernel for the weighted SSD can be a Gaussian kernel, a Laplacian kernel, or any other kernel that provides appropriate characteristics for the weighted SSD. The weighted SSD block can be configured to adjust the arithmetic representation and precision to achieve the desired numerical performance at a desired power consumption level.

At a high level, the weighted SSD block and the NLM system that embodies such weighted SSD block can be configured to improve the efficiency at least by (1) adjusting the representation of pixel values and (2) performing squaring operations using bit-shift operators and look-up tables instead of multipliers. In some embodiments, the NLM system can be configured to use an un-signed representation for pixel values, instead of floating point representations. For example, the weighted SSD block is configured to convert a 16-bit floating-point (fp16) representation of a pixel value into a 12-bit unsigned (U12) representation. The U12 representation can represent values in the range [0, 1.0]. This representation conversion allows the weighted SSD block to efficiently compute the weighted average at an equivalent performance to an fp16 (IEEE-like 16-bit floating-point) implementation. In some embodiments, the squaring operation in the NLM system can be performed using an approximate squaring operator, which includes a bit-shifter and a lookup table. The approximate squaring operator can be configured so that the output of the approximate squaring operator can be a close-enough approximation to the actual squaring operation.

Figure 7B:
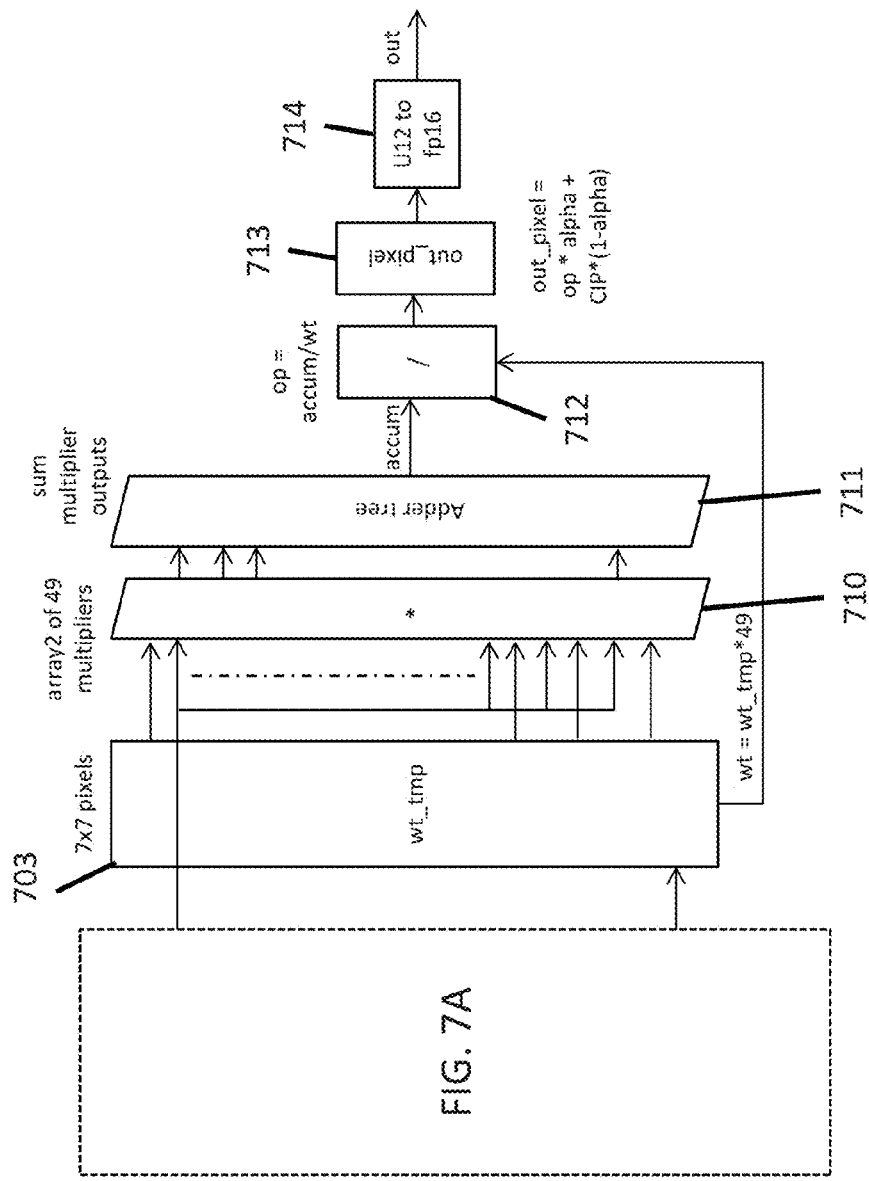

FIGS. 7A-7B illustrate an NLM system in accordance with some embodiments. The NLM system 700 can be configured to receive (1) a source patch and (2) a target patch. The source patch can be received at a first representation converter 701. In some embodiments, the first representation converter 701 can be configured to convert values in the source patch from fp16 to U12. The values in the fp16 representation are converted into U12 using the following relationship:

$$a = b \times \frac{1.0}{(2^N - 1)}$$

where b represents the fp16 value having sixteen bits (the first bit representing the sign, the subsequent five bits representing the exponent, and the remaining eleven bits representing the mantissa), a represents the U12 value, and N is the number of bits in the unsigned fixed-point integer representation.

Figure 8:
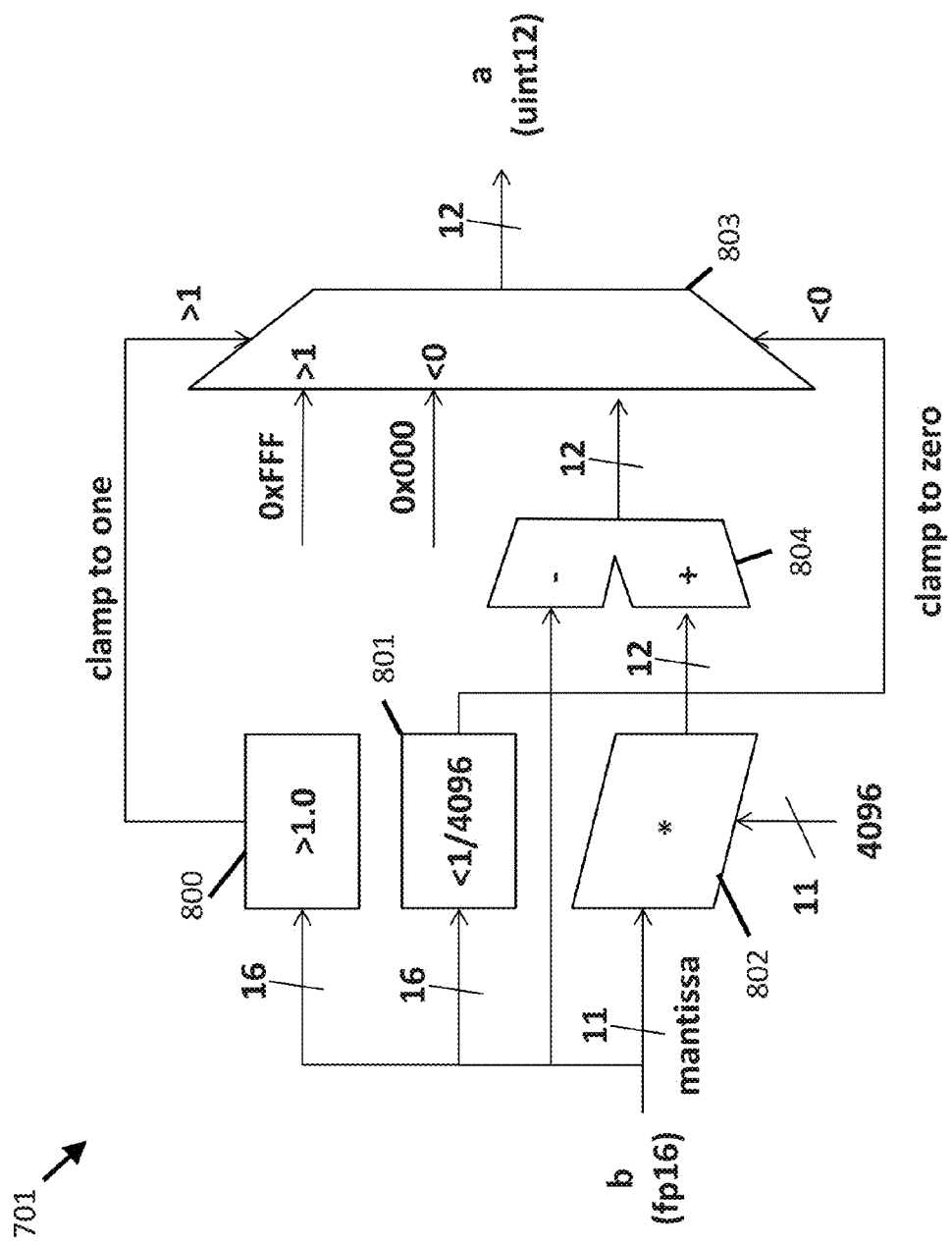
FIG. 8 illustrates a representation converter configured to convert a floating-point value to an unsigned value in accordance with some embodiments.

FIG. 8 illustrates an embodiment of the first representation converter 701 in accordance with some embodiments. The first representation converter 701 can include a clamp-to-one comparator 800 and a clamp-to-zero comparator 801. The clamp-to-one comparator 800 and the clamp-to-zero comparator 801 are configured to detect values outside the range 0.0 to 1.0 in the fp16 representation. When the output of the clamp-to-one comparator 800 is high, then the first representation converter 701 can be configured to clamp the output to 1 (e.g., 0xFFF) via the output multiplexer 803. When the output of the clamp-to-zero comparator 801 is high, then the first representation converter 701 can be configured to clamp the output to zero (e.g., 0x000) via the output multiplexer 803. In the case where neither comparator output is high, then the mantissa of the fp16 input is multiplied by 4096 (0x800) using a 12-bit unsigned multiplier 802 whose output has the 11-bit input mantissa value subtracted from it using a 12-bit subtractor 804, which passes unclamped via the output multiplexer 803 to the output of the first representation converter 701.

In some embodiments, the NLM system 700 can be configured to receive a target patch. The NLM system 700 can include a second representation converter 704 that is configured to receive a target patch and convert an fp16 representation of the target patch into a U8 representation. The second representation converter 704 can be substantially similar to the first representation converter 701 illustrated in FIG. 8, but with different values provided in the clamp-to-zero comparator 801 and the unsigned multiplier 802.

Figure 9A:
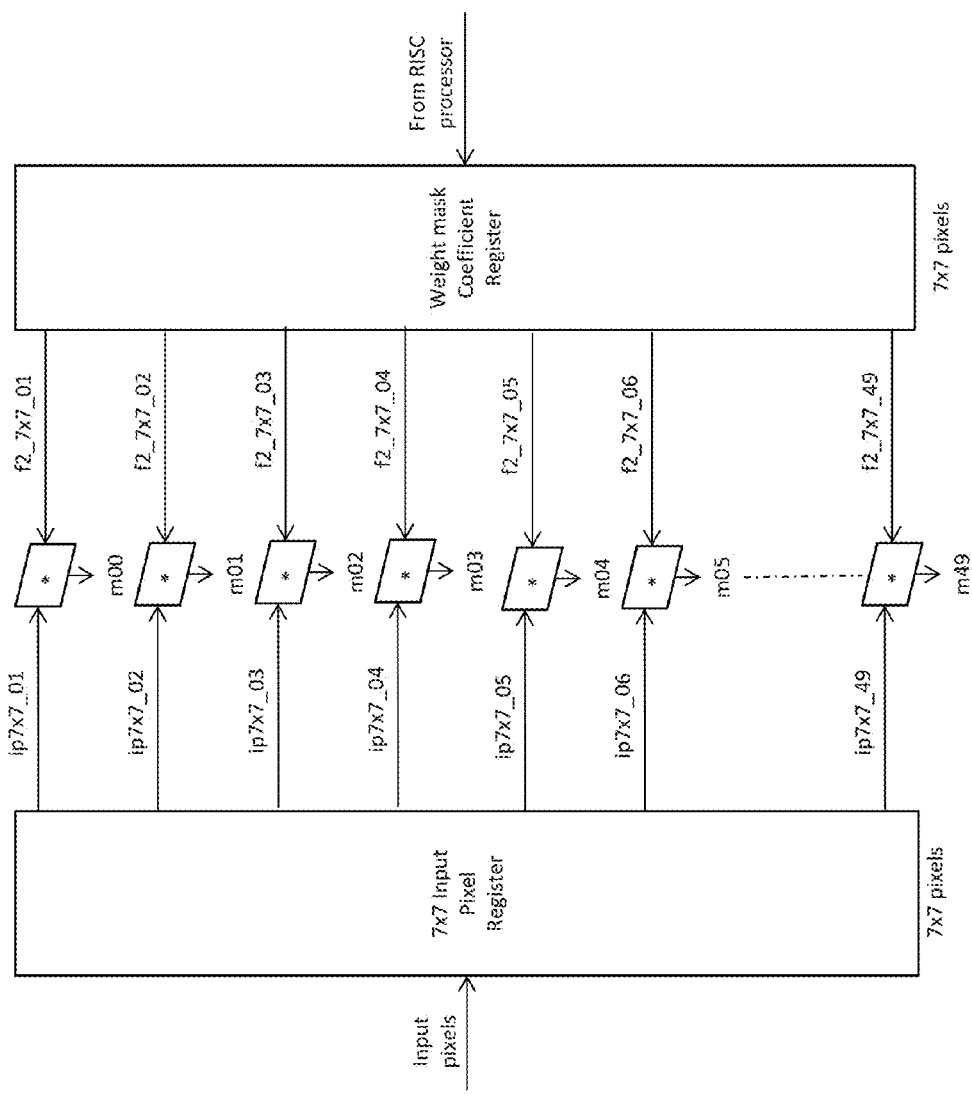
FIG. 9A illustrates a multiplier in accordance with some embodiments.

Subsequently, the second representation converter 704 provides the converted target patch to the weighted SSD block 715. The weighted SSD block 715 can be configured to provide the converted target patch and the converted source patch to the subtractor 705. The subtractor 705 can be configured to generate an 11×11 kernel around the 5×5 target patch, generate a 7×7 crop of the 11×11 kernel, and compute a difference between one pixel of the U12 source patch 702 and the 7×7 crop of the 11×11 kernel, thereby creating a 7×7 difference patch 706. The difference patch 706 is provided to the multiplier 708, which can be configured to multiply each pixel in the different patch 706 with a corresponding value of the weighting mask 707 that defines the weights for the weighted summation. Therefore, the multiplier 708 provides a weighted difference patch at its output. In some embodiments, the weighting mask can be stored in a register bank 707. FIG. 9A illustrates the multiplier 708 in accordance with some embodiments. In some embodiments, the weighting mask 707 can be provided by a processor that controls the operation of the weighted SSD block 700.

Figure 9B:
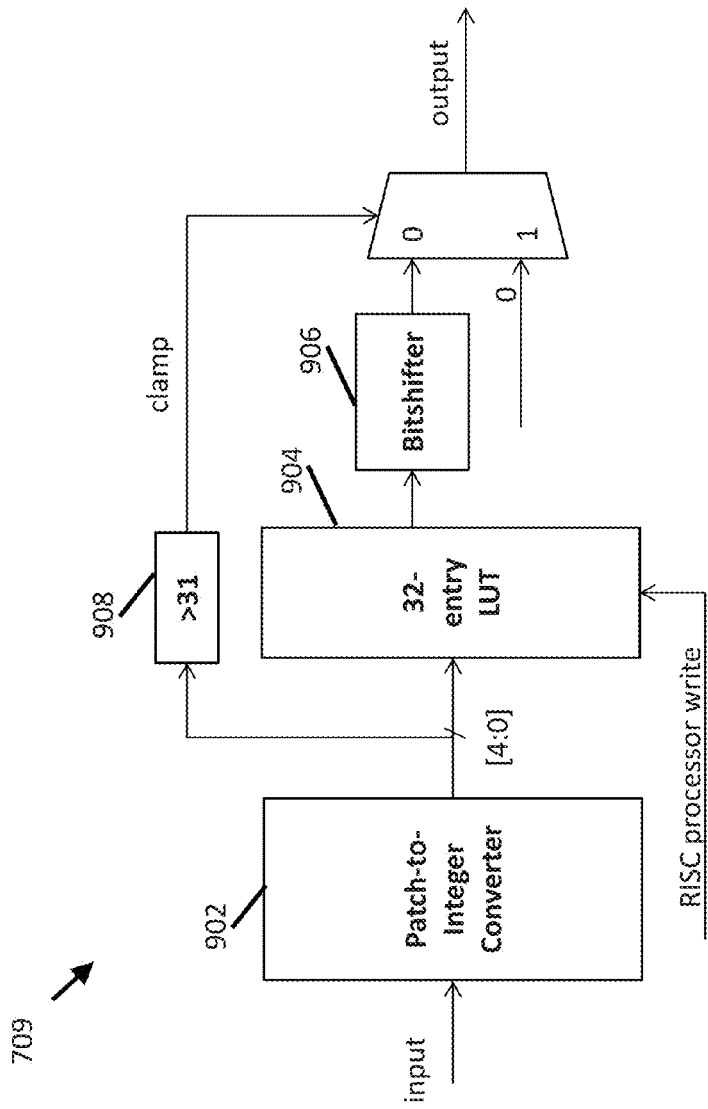
FIG. 9B illustrates the intensity function block that uses a lookup table (LUT) and a bit-shifter to approximate a multiplier in accordance with some embodiments.

Subsequently, the multiplier 708 can be configured to provide the weighted difference patch to the intensity function block 709. The intensity function block 709 can be configured to compute a squared value of the weighted difference patch. In some embodiments, the intensity function block 709 can be implemented using a multiplier. In other embodiments, the intensity function block 709 can be implemented using an approximate lookup table (LUT) and a bit-shifter to approximate the multiplier. FIG. 9B illustrates the intensity function block 709 that uses a LUT and a bit-shifter to approximate the multiplier in accordance with some embodiments. The intensity function block 709 can include a patch-to-integer converter 902 that converts the input—the weighted difference patch—to an integer value. Next, the lower 5 bits are provided to the LUT 904 to be used as a look-up address for the LUT 904. Then the intensity function block 709 is configured to bit-shift the output of the LUT 904 using the bit-shifter 906 to approximate the multiplication.

In some embodiments, the values in the LUT 904 can be pre-computed using software and stored locally in the intensity function block 709. In some cases, the values in the LUT 904 can be pre-computed based on a Gaussian function. The Gaussian function can be used to achieve a desirable input-to-output-mapping at reduced computational complexity. In other cases, the values in the LUT 904 can be pre-computed based on a polynomial function. The polynomial function can be fitted to provide a desirable input-to-output-mapping. When the input value is greater than 31 (e.g., outside of the 5-bit range), which can be detected by the comparator 908, the output of the intensity function 709 can be clamped to zero, and the LUT 904 search can be bypassed to reduce power consumption.

Approximating the squaring operation in the intensity function block 709 using the LUT 904 and the bit-shifter 906 has negligible discernible impact on the quality of the denoised image. In some embodiments, the intensity function block 709 can include the LUT 904 and a programmable bit-shifter 906, whereas the software that operates in conjunction with the intensity function block 709 is configured to provide the values in the LUT 904 and the number of bits to be shifted by the bit-shifter 906.

The intensity function 709 can provide the computed sum of squared difference and provide it to the weight generation block 703. The weight generation block 703 can replicate the received output of the intensity function to and provide the replicated values as a weight. In some embodiments, the weight also has the same number of pixels as the source patch. For example, when the source patch has N×N pixels, the weight generated by the weight generation block also has N×N pixels. The weight can be provided to the bit-wise multiplication block 710, which can multiply the weight with the value of the central pixel in the source patch 702. Then the adder 711 computes the sum of the multiplications; the normalization block 712 normalizes the sum of the multiplications. Finally, the output pixel generation block 713 generates the denoised output pixel value by computing a weighted average of the normalized sum of the multiplications and the central pixel value of the source patch 702.

Figure 10:
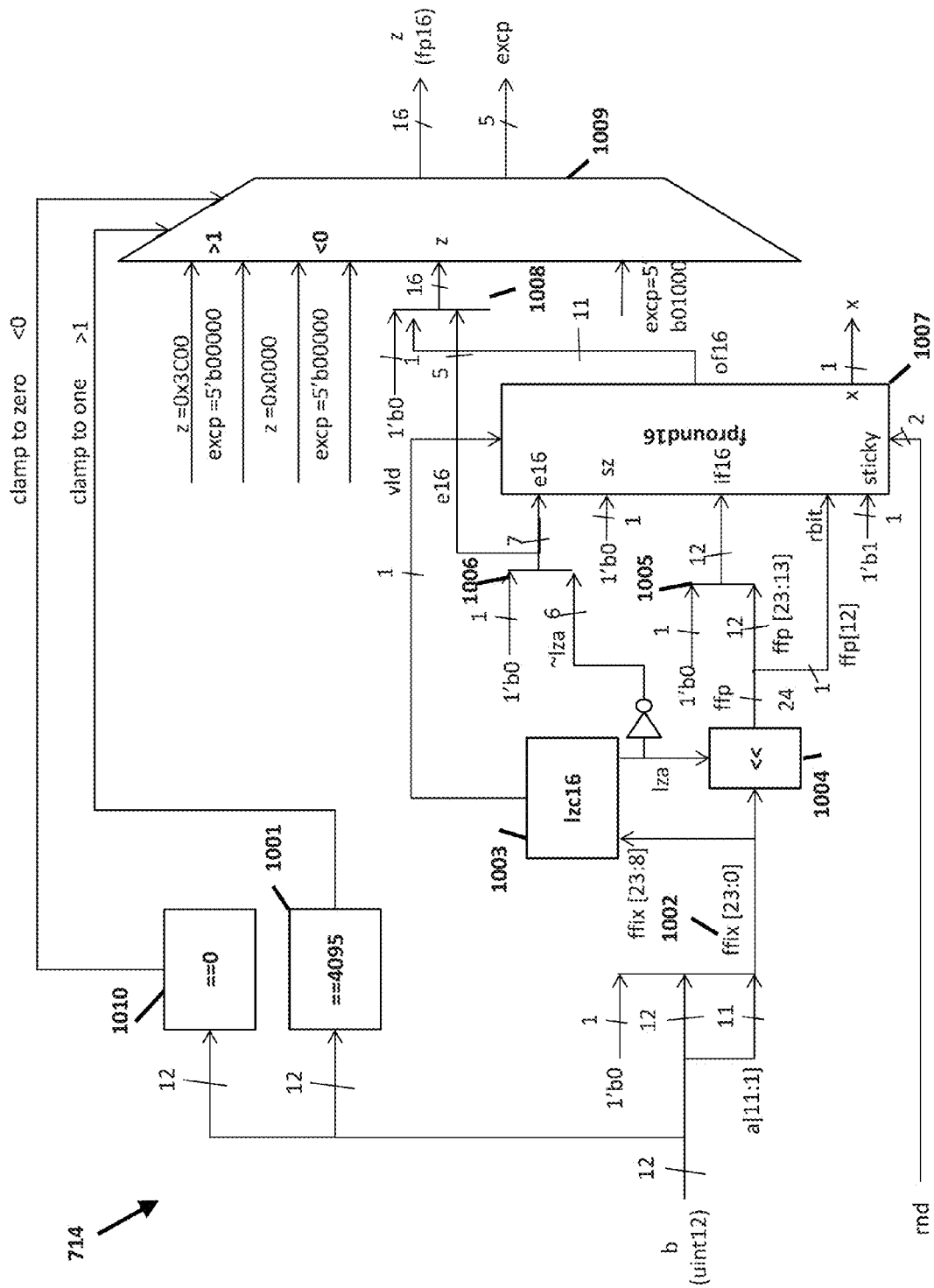
FIG. 10 illustrates a representation converter configured to convert an unsigned value to a floating-point value in accordance with some embodiments.

In some embodiments, once the output pixel generation block 713 computes the denoised value of a pixel 102, the NLM system can be use a third representation converter 714 to convert the unsigned representation of the denoised value to a floating point representation. FIG. 10 illustrates a representation converter configured to convert an unsigned value to a floating-point value in accordance with some embodiments. In this illustration, the input of the representation converter 714 is a 12-bit unsigned integer and the output of the representation converter 714 is a 16-bit floating-point value.

FIG. 11 illustrates a mechanism for converting an unsigned integer to a floating-point value in accordance with some embodiments. This mechanism allows the representation converter 714 to achieve a desired degree of accuracy when converting an unsigned integer to a floating point value. This mechanism is based on how division of a value x, by $2^n-1$ can be represented as $$\frac{x}{2^n}$$

plus a remainder y, where n represents the number of bits of the desired precision. This relationship is shown in Eq. 1 in FIG. 11. This relationship can be reorganized to represent y as a function of x, as shown in Eq. 2 in FIG. 11. Subsequently the Eq. 2 can be back-substituted into Eq. 1 to derive the relationship in Eq. 3.

The representation converter 714 can use Eq. 3 to derive a mechanism for converting an unsigned integer to a floating-point value with a desired degree of accuracy. For example, the representation converter 714 can expand the term, $$\frac{x}{(2^N-1)},$$

on the right-hand-side of Eq. 3 using Eqs. 1 and 2 to derive Eq. 4, which can be rearranged as Eq. 5. The representation converter 714 can expand the term, $$\frac{x}{(2^N-1)},$$

on the right-hand-side of Eq. 5 iteratively until the desired accuracy is achieved. This repeated expansion allows a minimum error representation of Eq. 1 using a sum of divisions of x by even powers of 2n, which can be implemented using a simple bit-shifter 1004, thereby minimizing hardware implementation complexity and cost.

The representation converter 714 can include three distinct signal paths: the first path through a zero comparator 1010 which is configured to detect that the input is zero and force the output z to 0x000, clamping it to 0.0; the second path via the comparator 1001 which is configured to detect that the input is 4095 and force the output z to 0x3C00, clamping it 1.0; and the third path which deals with the remaining cases.

This third path includes an initial expansion using the series representation shown in FIGS. 11 to 24-bit fixed-point format in 1002, the upper bits of the output of 1002 ffix[23:8] are applied to a leading-zero comparator (LZC) 1003 which produces an lza output as well as a valid signal vld that is used later in the rounding logic 1007. The lza signal is used to control a left shifter 1004 whose output ffp is applied to the rounding logic 1007.

The lza value is inverted and has a zero msb appended in 1006, and the ffp value also has a zero msb appended in 1005 and finally the ffp[12] bit is used as the rounding bit (rbit) input to the rounding logic 1007. The final input to the rounding logic 1007 is the sticky bit, which is set to 1.

Figure 12:
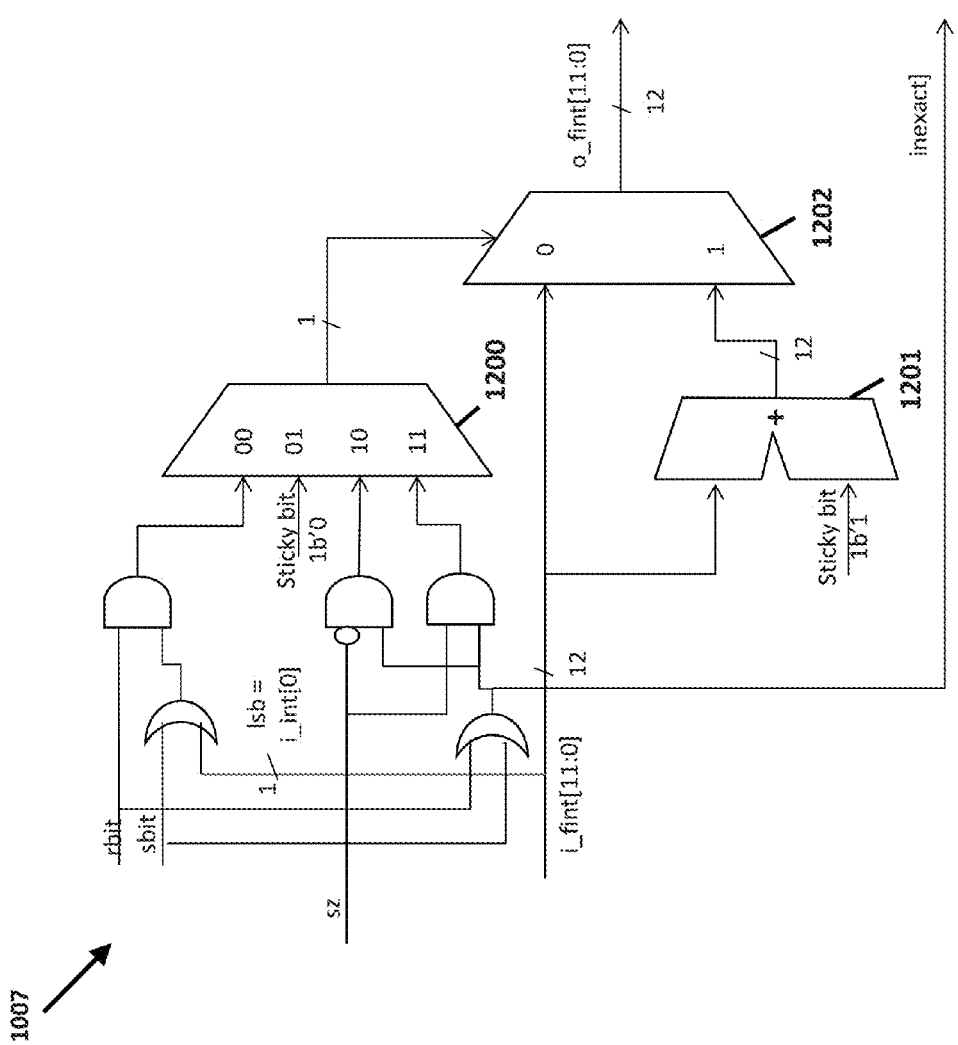
FIG. 12 shows a rounding logic in accordance with some embodiments.

FIG. 12 shows the rounding logic in accordance with some embodiments. rbit of the rounding logic 1007 in FIG. 12 is connected to ffp[12] of the 24-bit ffp[23:0] output from the bit-shifter 1004; sbit of the rounding logic 1007 in FIG. 12 is connected to the sticky bit which is set permanently to logic 1 in this implementation; i_fint[11:0] of the rounding logic 1007 in FIG. 12 is connected to ffp[23:13], which is prepended by a 0 as the 12-bit integer is unsigned; o_fint[11:0] of the rounding logic 1007 in FIG. 12 is connected to of 16; sz input of the rounding logic 1007 in FIG. 12 is connected to logic 1; and the inexact output is connected to x in FIG. 10. The output o_fint[11:0] of the rounding logic 1007 is concatenated in 1008 with a zero sign-bit, 5-bit exponent obtained by inverting the lza output and prepending it by a 0 msb and the 11-bit of 16 output from the rounding logic 1007. Unless the comparators 1001, 1010 detect that the input is 0 or 1, the output multiplexer 1009 sets the output z to the value received of the received z 1008.

In some embodiments, the NLM system is configured to adapt the NLM operation based on a relevancy mask. The relevancy mask can indicate a region of an image from which target patches can be extracted. For example, the relevancy mask can include a depth map indicating a distance, from the imaging device, from which a particular pixel value was detected. Therefore, in some embodiments, the NLM system can be configured to derive target patches only from the pixels associated with the depth similar to the source patch. In some embodiments, the weight-mask can be multiplied by the relevancy-mask so that only the relevant pixels are used to compute the similarity metric. In the preferred embodiments, the precision requirements mean that 3 bits (range of the relevancy mask is [0, 7]) multiplies or alternately simple shifts are sufficient to provide the depth granularity required by the target applications while minimising the required hardware complexity, implementation cost and power.

Figure 13:
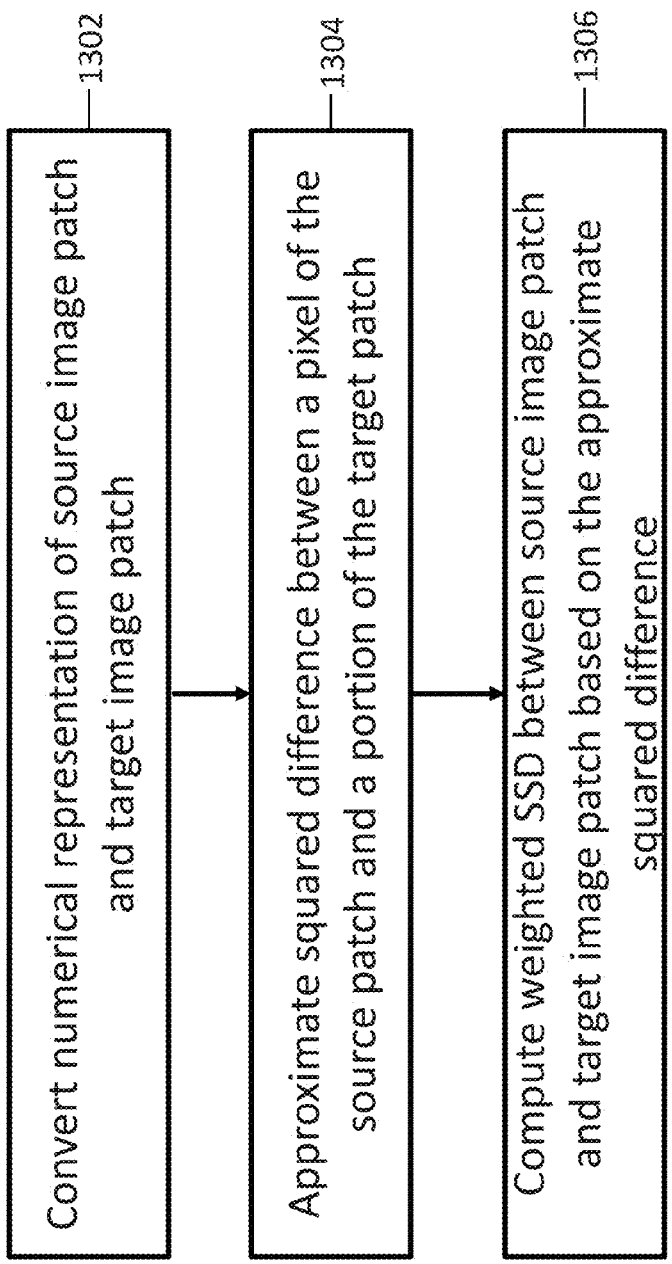
FIG. 13 shows a process for computing a weighted SSD based on an approximation in accordance with some embodiments.

FIG. 13 illustrates a process for computing an approximation of a weighted SSD in accordance with some embodiments. In step 1302, the weighted SSD block 700 can convert the numerical representation of the source image patch and the target image patch from a floating point representation to a unsigned representation. In step 1304, the weighted SSD block 700 can compute an approximate sum of squared difference between one of the pixels in the converted source image patch and a portion of the converted target image patch. The approximate sum of squared difference can be computed using a lookup table (LUT) and a bit-shifter. In step 1306, the weighted SSD block 700 can compute a weighted SSD between the source image patch and the target image patch based on the approximate sum of squared difference between the one of the pixels in the converted source image patch and a portion of the converted target image patch.

Figure 14:
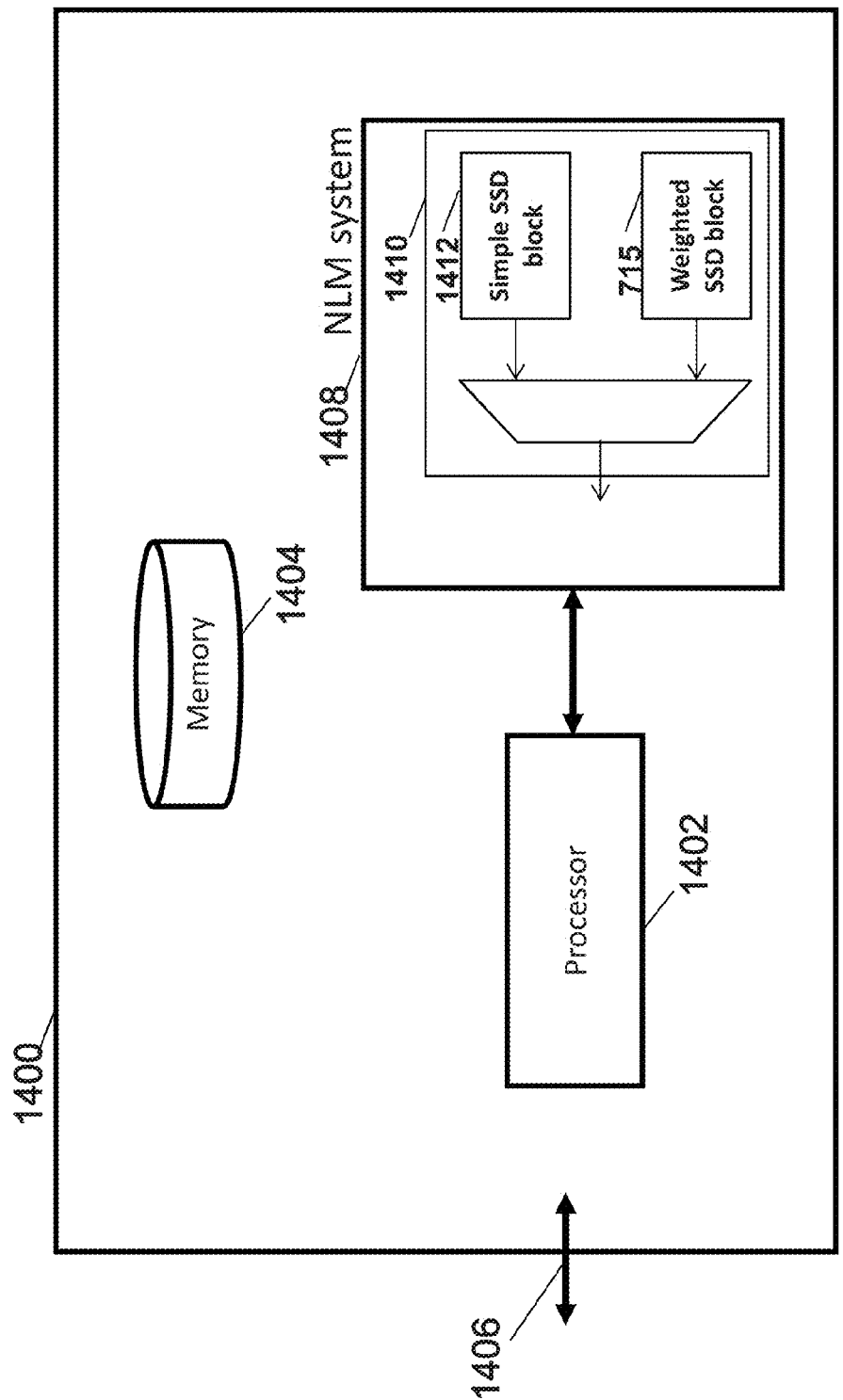
FIG. 14 illustrates an electronic device that includes an NLM system in accordance with some embodiments.

In some embodiments, the NLM system can reside in an electronic device. FIG. 14 illustrates an electronic device that includes an NLM system in accordance with some embodiments. The electronic device 1400 can include a processor 1402, memory 1404, one or more interfaces 1406, and an NLM system 1408. The NLM system 1408 can include a similarity metric computation block 1410. The similarity metric computation block 1410 can include a simple SSD block 1412 and/or a weighted SSD block 700. The simple SSD block 1412 can be configured to compute the similarity metric using an SSD operation. The simple SSD block 1412 can include one or more SSD blocks 402, 452, 502. The weighted SSD block 715 can be configured to compute the similarity using a weighted SSD operation. In some embodiments, the similarity metric computation block 1410 can be configured to determine whether the similarity should be computed based on a simple SSD or based on a weighted SSD. If the similarity metric computation block 1410 determines that the similarity should be computed based on a simple SSD, then the similarity metric computation block 1410 can use the simple SSD block 1412, such as the SSD block 402, 452, 502, to compute the similarity metric. If the similarity metric computation block 1410 determines that the similarity metric should be computed based on a weighted SSD, then the similarity metric computation block 1410 can use the weighted SSD block 700 to compute the similarity metric.

The electronic device 1400 can have memory 1404 such as a computer readable medium, flash memory, a magnetic disk drive, an optical drive, a programmable read-only memory (PROM), and/or a read-only memory (ROM). The electronic device 1400 can be configured with one or more processors 1402 that process instructions and run software that may be stored in memory 1404. The processor 1402 can also communicate with the memory 1404 and interfaces 1406 to communicate with other devices. The processor 1402 can be any applicable processor such as a system-on-a-chip that combines a CPU, an application processor, and flash memory, or a reduced instruction set computing (RISC) processor.

In some embodiments, the NLM system 1408 can be implemented in hardware. The processor might also be implemented in hardware using an application specific integrated circuit (ASIC), programmable logic array (PLA), field programmable gate array (FPGA), or any other integrated circuit. In some cases, the NLM system 1408 can be synthesized using a hardware description language, including Verilog, VHDL, and/or Bluespec.

The interfaces 1406 can be implemented in hardware or software. The interfaces 1406 can be used to receive both data and control information from the network as well as local sources, such as a remote control to a television. The electronic device can also provide a variety of user interfaces such as a keyboard, a touch screen, a trackball, a touch pad, and/or a mouse. The electronic device may also include speakers and a display device in some embodiments.

In some embodiments, the NLM system 1408 can be implemented as a system on chip (SOC). In other embodiments, one or more blocks in the NLM system 1408 can be implemented as a separate chip, and the NLM system 1408 can be packaged in a system in package (SIP). In some embodiments, the NLM system 1408 can be used for data processing applications. The data processing applications can include image processing applications and/or video processing applications.

The electronic device 1400 can include a mobile device, such as a cellular phone. The mobile device can communicate with a plurality of radio access networks using a plurality of access technologies and with wired communications networks. The mobile device can be a smart phone offering advanced capabilities such as word processing, web browsing, gaming, e-book capabilities, an operating system, and a full keyboard. The mobile device may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile device may have the capability to run applications or communicate with applications that are provided by servers in the communications network. The mobile device can receive updates and other information from these applications on the network.

The electronic device 1400 can also encompasses many other devices such as televisions (TVs), video projectors, set-top boxes or set-top units, digital video recorders (DVR), computers, netbooks, laptops, tablet computers, and any other audio/visual equipment that can communicate with a network. The electronic device can also keep global positioning coordinates, profile information, or other location information in its stack or memory.

It will be appreciated that whilst several different arrangements have been described herein, that the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. An apparatus, implemented in a semiconductor integrated chip, for operating a composite function, comprising a first function and a second function, on a first patch of an image, the apparatus comprising:
    a first function operator configured to receive, at a first cycle of a clock signal, a group of pixel values associated with the first patch of the image and operate the first function on the group of pixel values to provide a first processed group of pixel values;
    a delay system configured to receive, at a second cycle of the clock signal, the first processed group of pixel values from the first function operator and maintain the received first processed group of pixel values for a predetermined period of time to provide a delayed processed group of pixel values; and
    a second function operator configured to receive, from the first function operator at a third cycle, a second processed group of pixel values and, from the delay system, the delayed processed group of pixel values, and operate a second function on at least the second processed group and the delayed processed group to determine an output of the composite function on the first patch of the image.

2. The apparatus of claim 1, wherein the delay system comprises at least one register.

3. The apparatus of claim 1, wherein the group of pixel values comprises a column of the first patch in the image.

4. The apparatus of claim 3, wherein when the first patch of the image comprises N columns, the delay system is configured to provide N−1 delayed processed groups of pixel values in the first patch to the second function operator, wherein each of the N−1 delayed processed groups are delayed by a different amount of time, and wherein the second function operator is configured to operate the second function on the second processed group and each of the N−1 delayed processed groups to determine the output of the composite function.

5. The apparatus of claim 3, wherein when the first patch of the image comprises N columns, the delay system is configured to provide a single delayed processed group of pixel values in the first patch to the second function operator, wherein the delayed processed group is delayed by N clock cycles, and wherein the second function operator is configured to operate the second function on the second processed group, the single delayed processed group, and a previous output of the composite function to provide the output of the composite function on the first patch of the image.

6. The apparatus of claim 1, wherein the group of pixel values comprises a row of the first patch in the image.

7. The apparatus of claim 6, wherein when the first patch of the image comprises N rows, the delay system is configured to provide N−1 delayed processed groups of pixel values in the first patch to the second function operator, wherein each of the N−1 delayed processed groups are delayed by a different amount of time, and wherein the second function operator is configured to operate the second function on the second processed group and each of the N−1 delayed processed groups to determine the output of the composite function.

8. The apparatus of claim 6, wherein when the first patch of the image comprises N rows, the delay system is configured to provide a single delayed processed group to the second function operator, wherein the delayed processed group is delayed by N clock cycles, and wherein the second function operator is configured to operate the second function on the current processed group, the single delayed processed group, and a previous output of the composite function to provide the output of the composite function on the first patch of the image.

9. The apparatus of claim 1, wherein the first function operator is configured to compute a summation of squared difference between a reference value and each one of the group of pixel values.

10. The apparatus of claim 1, wherein the second function operator is configured to compute a summation of at least the second processed group and the delayed processed group to determine the output of the composite function.

11. The apparatus of claim 1, wherein the second function operator is configured to compute a difference of at least the second processed group and the delayed processed group to determine the output of the composite function.

12. The apparatus of claim 1, further comprising a third function operator operating in parallel with the second function operator, wherein the third function operator is configured to provide an output of the composite function on a second patch of the image that overlaps, in part, with the first patch of the image.

13. A method for operating a composite function, comprising a first function and a second function, on a first patch of an image using an apparatus implemented in a semiconductor integrated chip, the method comprising:
receiving, at a first function operator of the apparatus at a first cycle of a clock signal, a group of pixel values associated with the first patch of the image and operating the first function on the group of pixel values to provide a first processed group of pixel values;
receiving, at a delay system of the apparatus at a second cycle of the clock signal, the first processed group of pixel values from the first function operator and maintaining the received processed group of pixel values for a predetermined period of time to provide a delayed processed group of pixel values; and
operating, at a second function operator of the apparatus at a third cycle of the clock signal, a second processed group of pixel values received from the first function operator and the delayed processed group received from the delay system to determine an output of the composite function on the first patch of the image.

14. The method of claim 13, wherein the delay system comprises at least one register.

15. The method of claim 13, wherein the group of pixel values comprises a column of the first patch in the image.

16. The method of claim 15, wherein when the first patch of the image comprises N columns, the method further comprises:
providing, by the delay system, N−1 delayed processed groups of pixel values in the first patch to the second function operator, wherein each of the N−1 delayed processed groups are delayed by a different number of clock cycles; and
operating, by the second function operator, the second function on the second processed group and all of the N−1 delayed processed groups to determine the output of the composite function.

17. The method of claim 15, when the first patch of the image comprises N columns, the method further comprises:
providing, by the delay system, a single delayed processed group to the second function operator, wherein the delayed processed group is delayed by N clock cycles; and
operating, by the second function operator, the second function on at least the second processed group, the single delayed processed group, and a previous output of the composite function to provide the output of the composite function on the first patch of the image.

18. The method of claim 13, wherein the group of pixel values comprises a row of the first patch in the image.

19. The method of claim 13, wherein operating the first function comprises computing a summation of squared difference between a reference value and each one of the group of pixel values in parallel.

20. An apparatus implemented in a semiconductor integrated chip for denoising a pixel in an image, the apparatus comprising:
a similarity metric computation block configured to determine a similarity metric between a source image patch, comprising the pixel, and one of a plurality of target image patches, wherein the similarity metric computation block comprises:
a first function operator configured to receive, at a first cycle of a clock signal, a group of pixel values associated with the one of the target image patches and operate the first function on the group of pixel values and a value of the pixel in the source image patch to provide a first processed group of pixel values;
a delay system configured to receive, at a second cycle of the clock signal, the first processed group of pixel values from the first function operator and maintain the first processed group of pixel values for a predetermined period of time to provide a delayed processed group of pixel values; and
a second function operator configured to receive the second processed group of pixel values from the first function operator and the delayed processed group of pixel values from the delay system, and operate a second function on at least the second processed group and the delayed processed group to provide the similarity metric between the source image patch and the one of the target image patches;
a weighted average block configured to average the value of the pixel with a corresponding value in the one of the target image patches in accordance with the similarity metric to provide a denoised value for the pixel in the image.

* * * * *